US008804168B2

(12) United States Patent
Nishikawa

(10) Patent No.: US 8,804,168 B2
(45) Date of Patent: Aug. 12, 2014

(54) SYSTEM, SERVER, IMAGE FORMING APPARATUS, SYSTEM CONTROL METHOD, AND STORAGE MEDIUM

(75) Inventor: Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 846 days.

(21) Appl. No.: 12/550,534

(22) Filed: Aug. 31, 2009

(65) Prior Publication Data

US 2010/0079793 A1 Apr. 1, 2010

(30) Foreign Application Priority Data

Sep. 29, 2008 (JP) ................................. 2008-251686

(51) Int. Cl.
*G06F 3/12* (2006.01)
*G06F 9/44* (2006.01)
*G06F 9/445* (2006.01)
*H04N 1/00* (2006.01)

(52) U.S. Cl.
CPC .... H04N 1/00915 (2013.01); *H04N 2201/0094* (2013.01); G06F 8/65 (2013.01); *H04N 2201/0039* (2013.01); H04N 1/00204 (2013.01); H04N 1/00244 (2013.01); H04N 1/00973 (2013.01); *H04N 2201/0082* (2013.01)
USPC .......... 358/1.15; 717/168; 717/170; 717/171; 717/172; 717/173; 358/1.13; 358/1.16

(58) Field of Classification Search
None
See application file for complete search history.

(56) References Cited

U.S. PATENT DOCUMENTS

| 6,652,169 | B2 * | 11/2003 | Parry ............................... 400/74 |
| 6,704,933 | B1 | 3/2004 | Tanaka et al. ................. 725/132 |
| 2006/0031664 | A1 * | 2/2006 | Wilson et al. ..................... 713/1 |
| 2007/0169075 | A1 * | 7/2007 | Lill et al. ....................... 717/168 |
| 2007/0285689 | A1 * | 12/2007 | Hozumi ........................ 358/1.9 |
| 2009/0204946 | A1 * | 8/2009 | Fienblit et al. ................ 717/124 |

FOREIGN PATENT DOCUMENTS

| JP | 2000-293365 | 10/2000 |
| JP | 2003-167746 A | 6/2003 |
| JP | 2006-059154 A | 3/2006 |
| JP | 2006-072761 | 3/2006 |

OTHER PUBLICATIONS

Office Action issued on Sep. 7, 2012, in counterpart Japanese Patent Application No. 2008-251686, with translation.

* cited by examiner

*Primary Examiner* — King Poon
*Assistant Examiner* — Vincent Peren
(74) *Attorney, Agent, or Firm* — Fitzpatrick, Cella, Harper & Scinto

(57) ABSTRACT

The present invention provides a server which distributes firmware to an image forming apparatus, the server including a determination unit configured to determine whether the firmware distributed to the image forming apparatus is released now, and a transmission unit configured to, when the firmware determined by the determination unit not to be released now has not been applied to the image forming apparatus, transmit instruction information containing an instruction to prevent application of the firmware to the image forming apparatus, and when the firmware determined by the determination unit not to be released now has been applied to the image forming apparatus, transmit instruction information containing an instruction to obtain either of alternative firmware and downgrade firmware to the firmware and apply the obtained firmware.

16 Claims, 21 Drawing Sheets

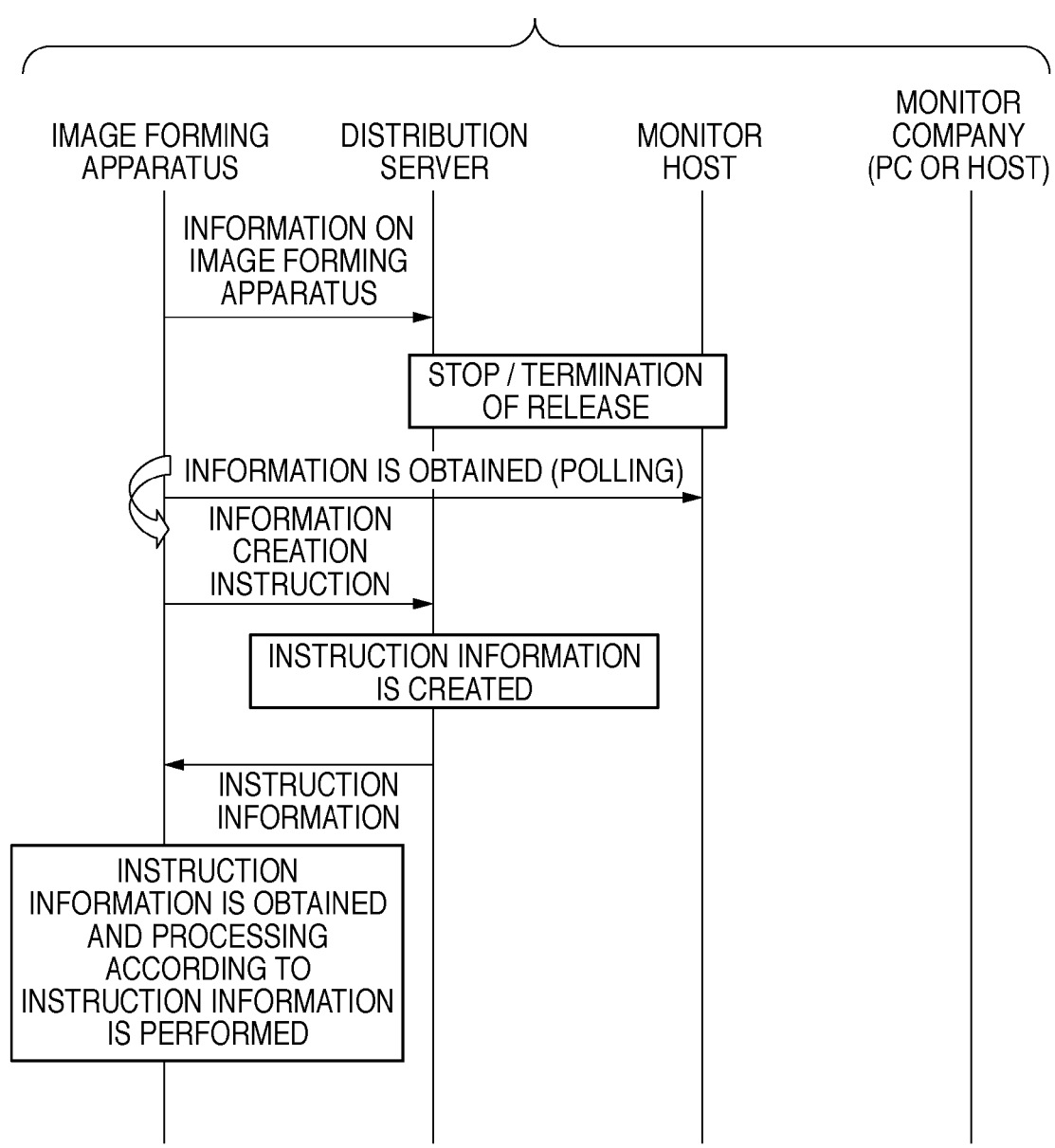

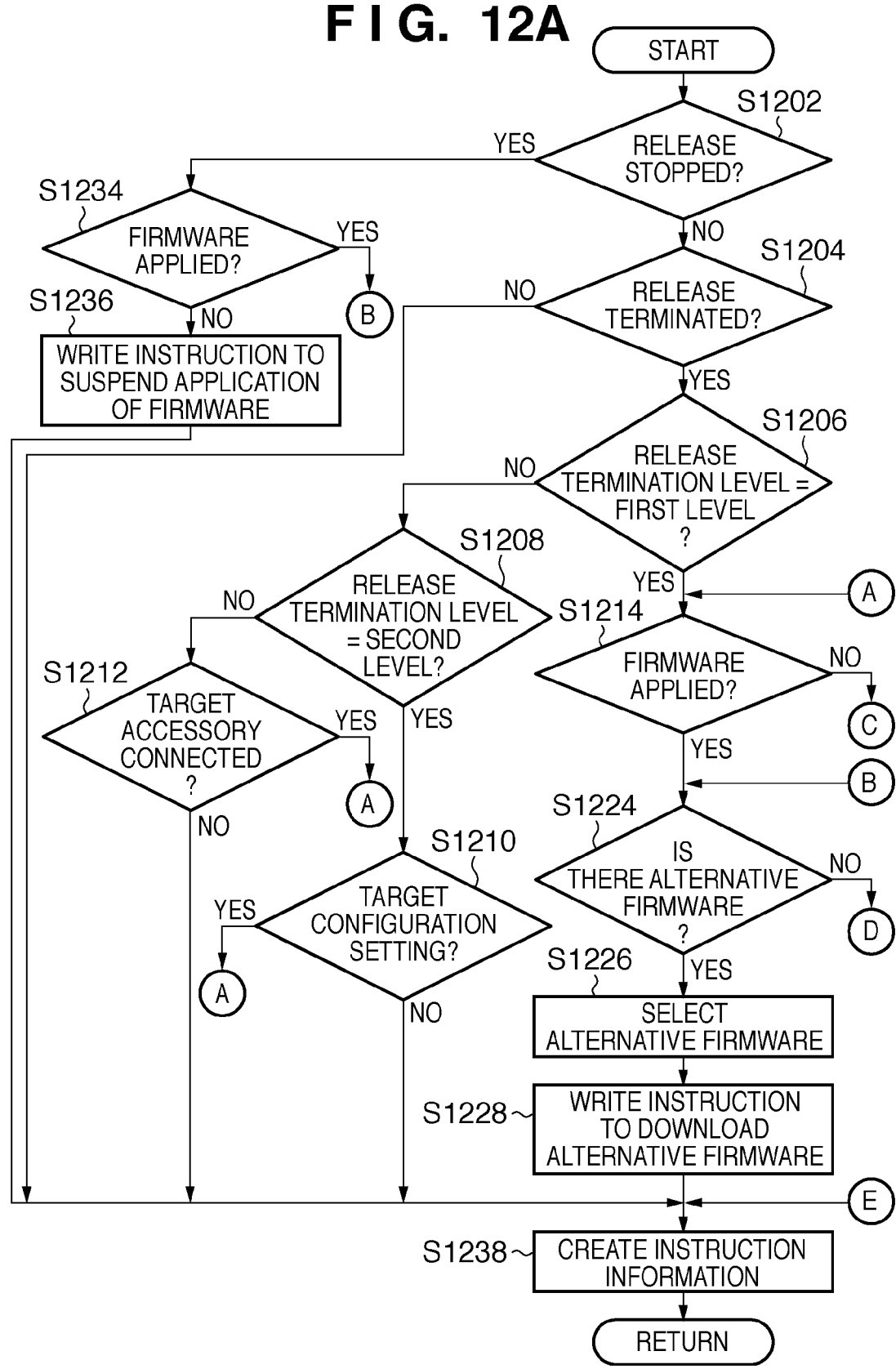

F I G. 13

```
RELEASE TERMINATION LEVEL
FIRST LEVEL : PROBLEM OCCURS IN ALL IMAGE FORMING APPARATUSES
SECOND LEVEL : PROBLEM OCCURS IN IMAGE FORMING APPARATUS
               HAVING TARGET CONFIGURATION SETTING
THIRD LEVEL : PROBLEM OCCURS WHEN TARGET ACCESSORY IS CONNECTED
```

FIG. 14

```
<?xml version="1.0" encoding="utf-8"?><soap:Envelope
xmlns:soap="http://schemas.xmlsoap.org/soap/envelope/" xmlns:xsi="http://www.w3.org/2001/XMLSchema-instance" xmlns:xsd="http://www.w3.org/2001/XMLSchema">
<soap:Body><getReservationListResponse
xmlns="http://www.xxx/"><getReservationListResult><OperationList>
Delete Download Firm
</OperationList>
</getReservationListResult></getReservationListResponse>
</soap:Body></soap:Envelope>
```

F I G. 15B
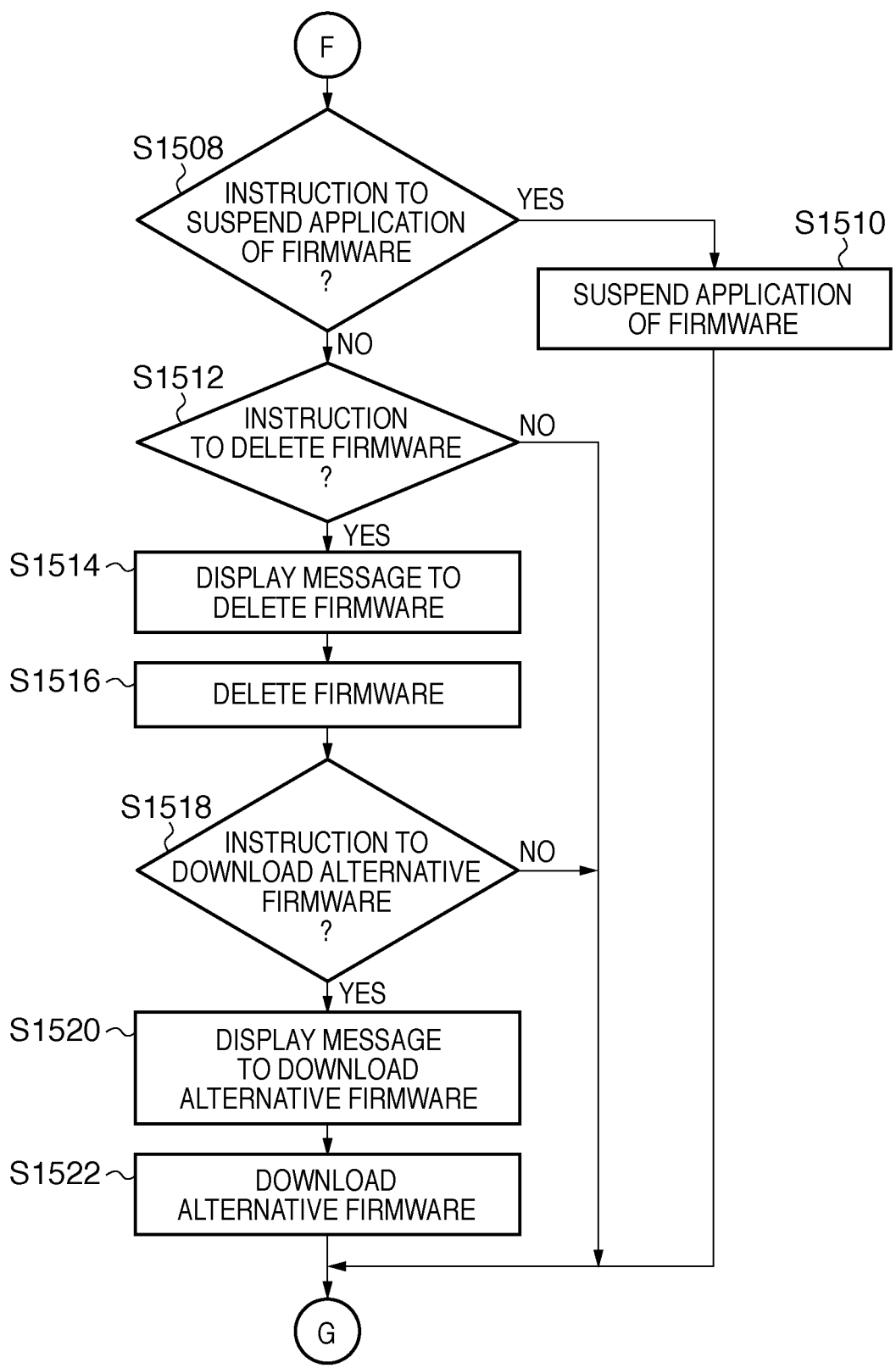

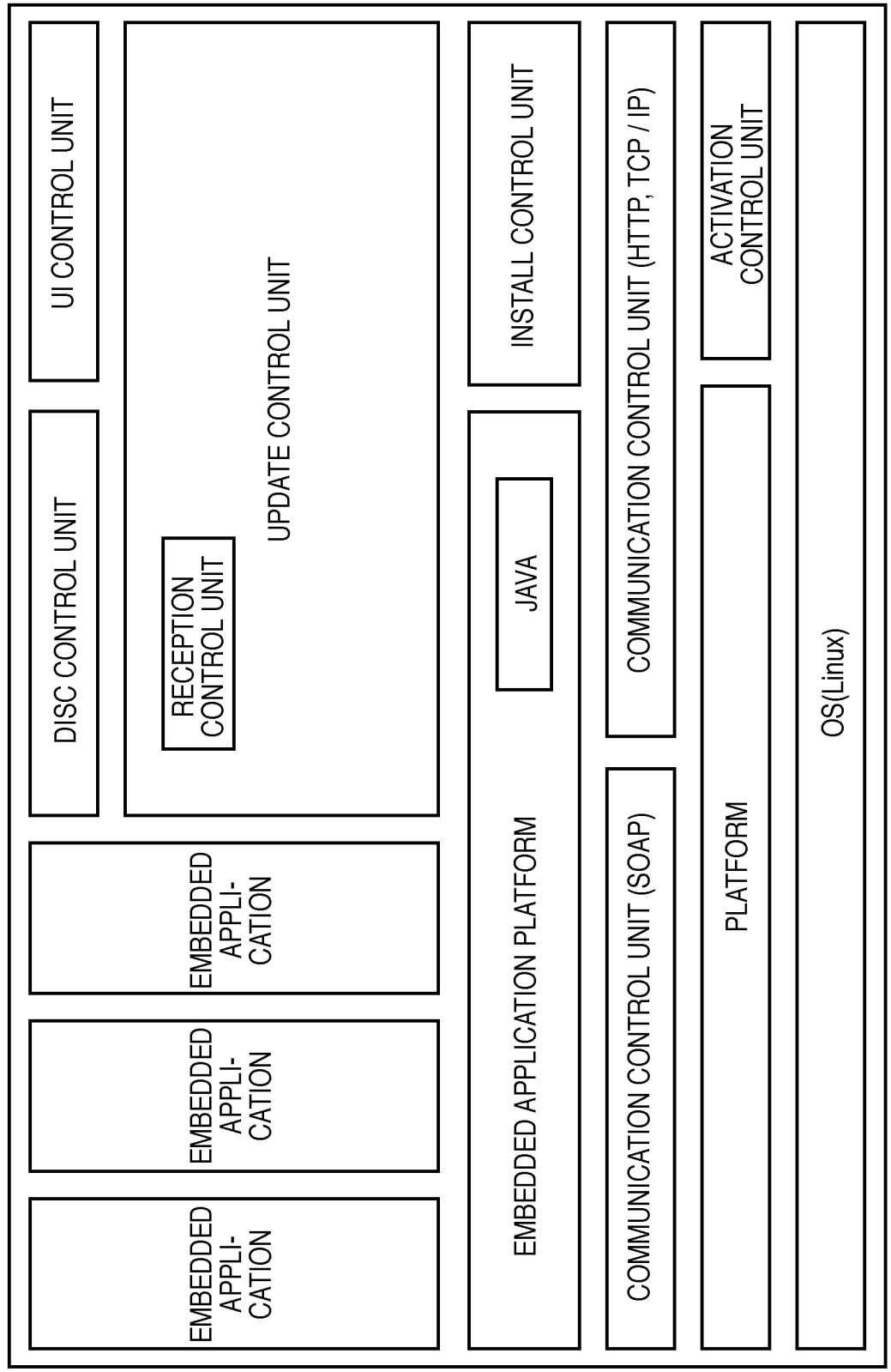

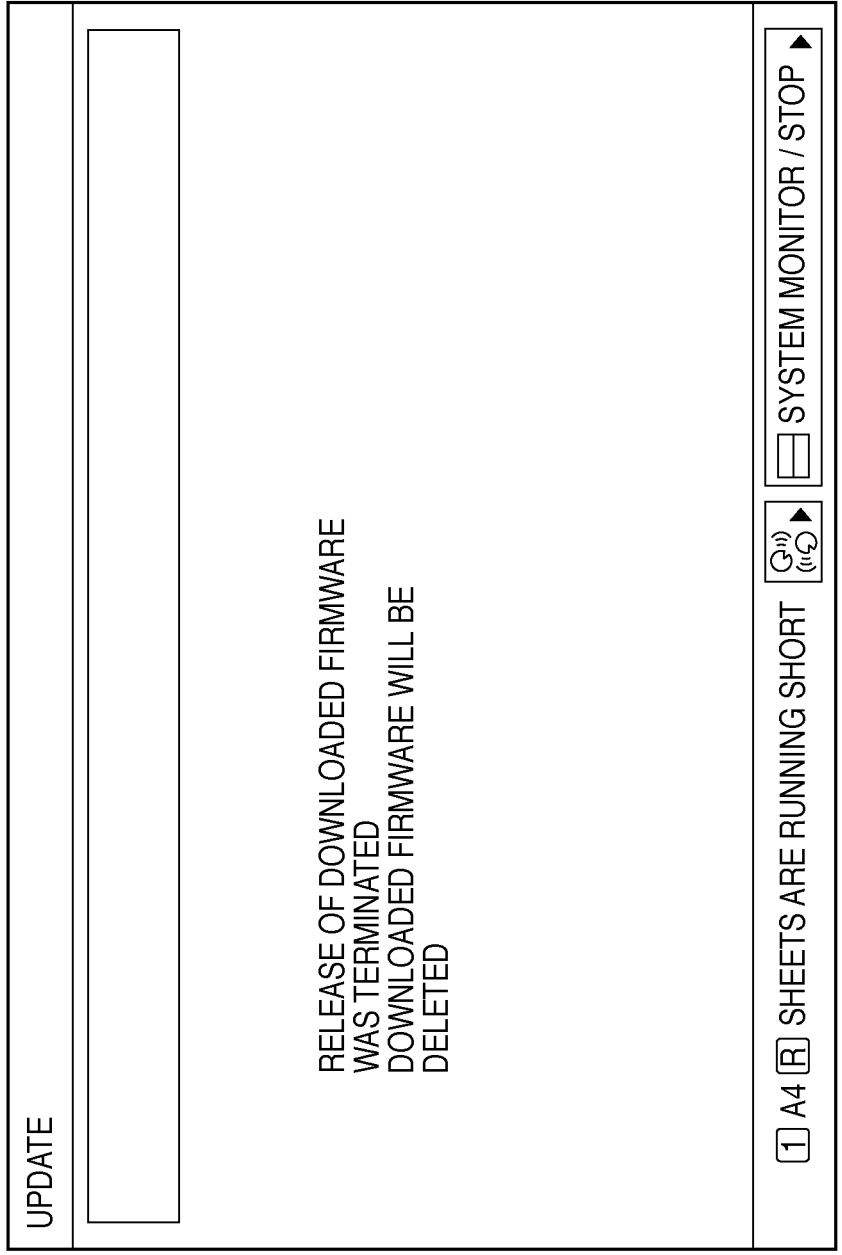

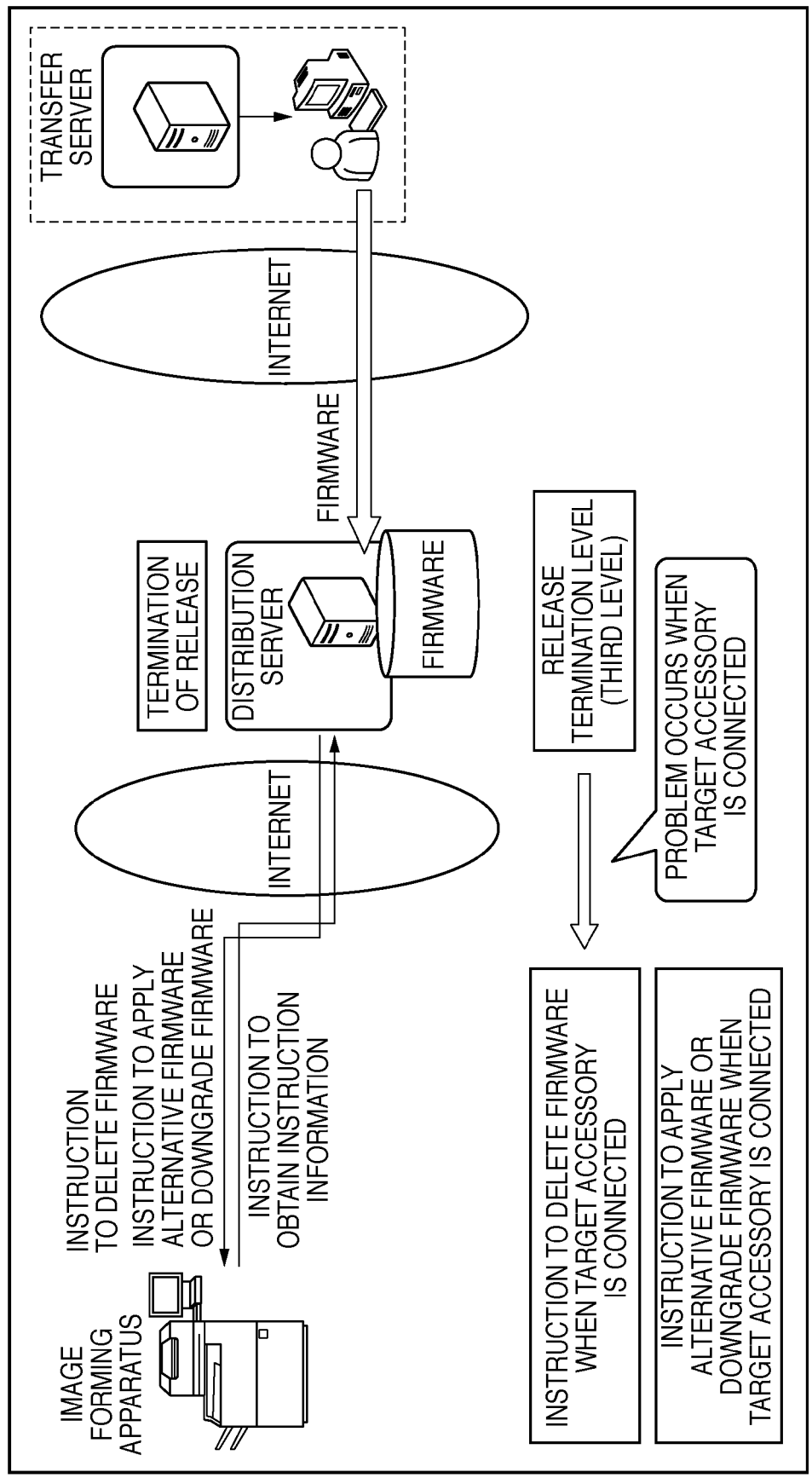

SYSTEM, SERVER, IMAGE FORMING APPARATUS, SYSTEM CONTROL METHOD, AND STORAGE MEDIUM

BACKGROUND OF THE INVENTION

1. Field of the Invention

The present invention relates to a system, server, image forming apparatus, system control method, and storage medium.

2. Description of the Related Art

Rapid functional advances of image forming apparatuses and the like boost demand for updating firmware of the image forming apparatuses quickly and efficiently (at low cost). Conventionally, when firmware of an image forming apparatus needs to be upgraded or updated owing to a failure or the like, a serviceman visits the customer and manually updates the firmware. This makes it difficult to quickly update firmware and raises the cost of updating the firmware.

Recently, there is proposed a technique of updating firmware by transmitting it via the Internet. According to this technique, an image forming apparatus is configured to store firmware in a rewritable storage device such as a flash memory.

For example, Japanese Patent Laid-Open No. 2006-72761 discloses a technique directed to a portable electronic device capable of communicating with an update server via a communication line. The portable electronic device disclosed in Japanese Patent Laid-Open No. 2006-72761 automatically accesses the update server at a predetermined timing to request updating of firmware. Upon receiving firmware transmitted from the update server in response to the request, the device updates it. Note that the portable electronic device disclosed in Japanese Patent Laid-Open No. 2006-72761 stops reception of firmware when the voltage of a battery power supply becomes lower than a predetermined value.

Japanese Patent Laid-Open No. 2000-293365 discloses a technique directed to an apparatus capable of restoring firmware to an original one (i.e., old version) if new firmware (program) downloaded for upgrading has a bug. The apparatus disclosed in Japanese Patent Laid-Open No. 2000-293365 holds firmware including that of an old version, and enables the old-version firmware upon receiving an instruction to restore the version.

These days, it is popular to download firmware from a server by an image forming apparatus and automatically update it, instead of having a serviceman update firmware manually.

However, according to the conventional technique, when the release of downloaded firmware is terminated after temporal release, the image forming apparatus cannot recognize the termination of release and keeps applying the firmware, the release of which is terminated. In this case, release means permitting downloading of new firmware as a trouble-free one for use. The termination of release means inhibiting downloading of new firmware as one which may cause an unexpected operation (i.e., causes a problem in use).

An image forming apparatus which has applied firmware, the release of which is terminated, may be undesirably kept used though it may cause an unexpected operation.

SUMMARY OF THE INVENTION

The present invention provides a technique of preventing application of firmware which is not released now (release of which is stopped or terminated), or use of an image forming apparatus while the firmware is kept applied.

According to one aspect of the present invention, there is provided a system comprising an image forming apparatus and a server which distributes firmware to the image forming apparatus, the server including a first determination unit configured to determine whether the firmware distributed to the image forming apparatus is released now, and a transmission unit configured to, when the firmware determined by the first determination unit not to be released now has not been applied to the image forming apparatus, transmit instruction information containing an instruction to prevent application of the firmware to the image forming apparatus, and when the firmware determined by the first determination unit not to be released now has been applied to the image forming apparatus, transmit instruction information containing an instruction to obtain either of alternative firmware and downgrade firmware to the firmware and apply the obtained firmware, and the image forming apparatus including an obtaining unit configured to obtain the instruction information from the server, a second determination unit configured to determine based on the instruction information obtained by the obtaining unit whether firmware not released now has been applied, a prevention unit configured to prevent application of the firmware in accordance with the instruction information when the second determination unit determines that the firmware not released now has not been applied, and an application unit configured to, when the second determination unit determines that the firmware not released now has been applied, obtain either of alternative firmware and downgrade firmware to the firmware in accordance with the instruction information and apply the obtained firmware.

Further aspects of the present invention will become apparent from the following description of exemplary embodiments with reference to the attached drawings.

BRIEF DESCRIPTION OF THE DRAWINGS

FIG. 11 is a chart for explaining a general sequence when release of firmware distributed to the image forming apparatus is stopped and then terminated in the system shown in FIG. 1.

FIGS. 12A and 12B are flowcharts for explaining processing associated with creation of instruction information by the distribution server in the system shown in FIG. 1.

FIG. 13 is a view exemplifying a release termination level set in the embodiment.

FIG. 14 is a view exemplifying a SOAP message created in step S1238 shown in FIG. 12A.

FIGS. 15A and 15B are flowcharts for explaining processing by the image forming apparatus after the distribution server distributes firmware in the system shown in FIG. 1.

FIG. 16 is a view showing the software configuration of the image forming apparatus in the system shown in FIG. 1.

FIG. 17 is a view exemplifying a window which displays a message to delete firmware, the release of which is terminated.

FIG. 21 is a view schematically showing the operation of the image forming apparatus in accordance with instruction information from the distribution server in the system shown in FIG. 1.

DESCRIPTION OF THE EMBODIMENTS

Figure 1:
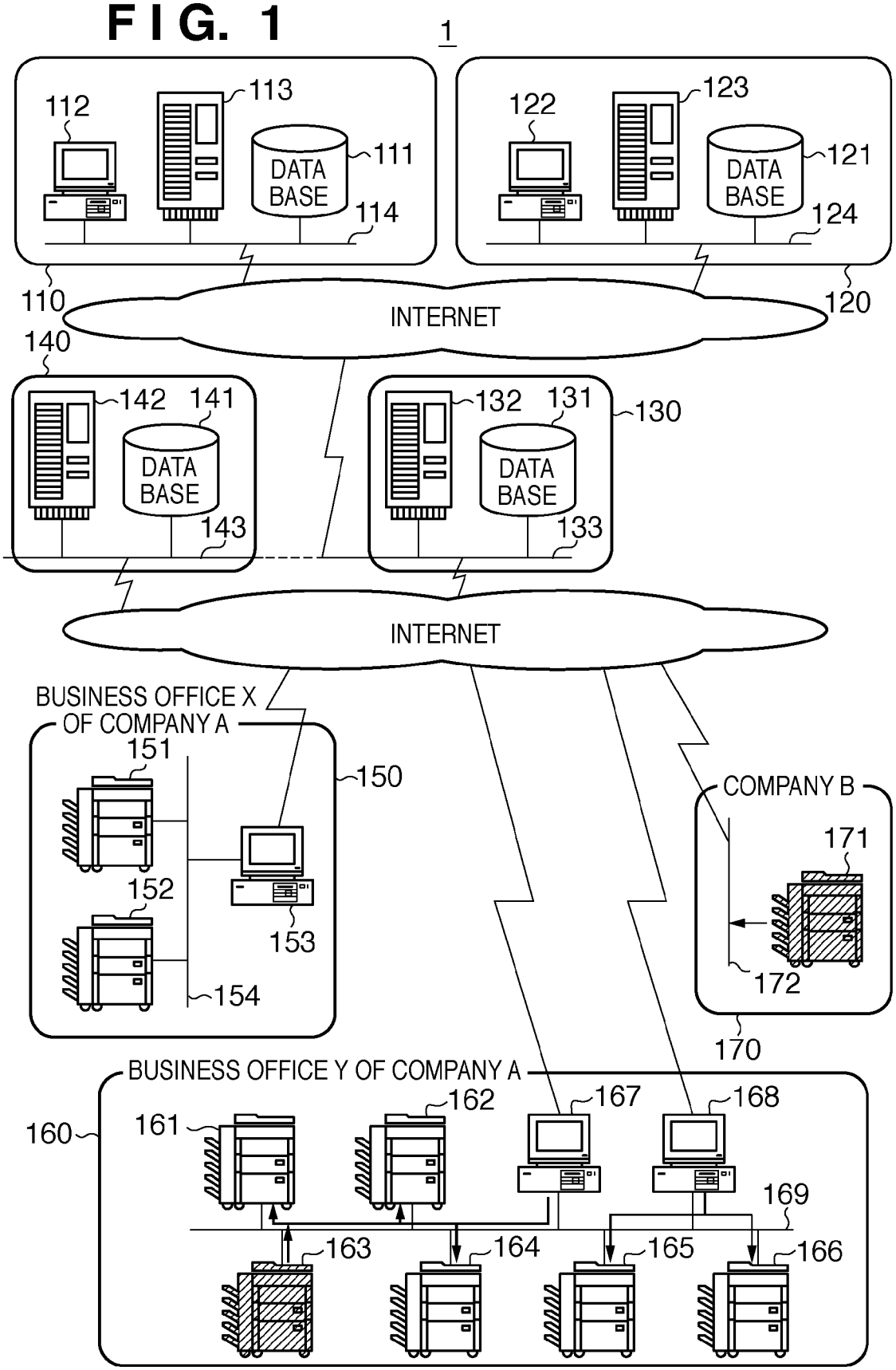
FIG. 1 is a view showing the overall configuration of a system according to an embodiment of the present invention.

A preferred embodiment of the present invention will be described in detail below with reference to the accompanying drawings. The same reference numerals denote the same parts throughout the drawings, and a repetitive description thereof will be omitted.

FIG. 1 is a view showing the overall configuration of a system 1 according to an embodiment of the present invention. The system 1 includes systems 110 and 120, a monitor system 130, and a distribution system 140 which belong to a monitor company for monitoring (managing) image forming apparatuses. The system 1 also includes image forming systems 150, 160, and 170 which belong to customers having image forming apparatuses.

An image forming apparatus monitor service by the monitor company in the system 1 of the embodiment is provided under a contract between the monitor company and a customer. The monitor company monitors only an image forming apparatus decided under a contract between the monitor company and a customer.

First, systems on the monitor company side will be explained.

The system 110 includes a database 111, personal computer (PC) 112, and host 113. Similarly, the system 120 includes a database 121, personal computer (PC) 122, and host 123. In the system 110, the database 111, PC 112, and host 113 are connected by a LAN 114. Similarly in the system 120, the database 121, PC 122, and host 123 are connected by a LAN 124.

The databases 111 and 121 store (accumulate) information (data) on monitor area information, customer information, and monitor information of the systems. The PCs 112 and 122 control, for example, registration of information (data) in the databases 111 and 121 and correction of information registered in the databases 111 and 121. The hosts 113 and 123 include operation units and display units, and can implement even the functions of the PCs 112 and 122.

In FIG. 1, each of the systems 110 and 120 includes a plurality of devices (database, PC, and host). However, the system is not limited to this configuration. For example, the databases 111 and 121 may physically exist in the hosts 113 and 123. The databases 111 and 121 may also reside at other locations via the Internet as long as they can be accessed (communicate with) from the hosts 113 and 123, respectively.

The monitor system 130 includes a database 131 and monitor host 132, and is interposed between the system of the monitor company and that of a customer. In the monitor system 130, the database 131 and monitor host 132 are connected by a LAN 133. The LAN 133 is connectable to the Internet.

The database 131 stores (accumulates) information for monitoring (managing) an image forming apparatus, and operation information (e.g., counter information, failure history information, and failure pattern table) which is obtained (collected) from a customer's system and represents the operating state of an image forming apparatus. The database 131 may physically exist in the monitor host 132. The database 131 may also reside at another location via the Internet as long as it can be accessed (communicate with) from the monitor host 132.

The monitor host 132 obtains (collects), from monitor apparatuses 153, 167, and 168 and an image forming apparatus 171, operation information representing the operating state of an image forming apparatus to be monitored. The monitor host 132 stores (accumulates) and processes the operation information, and gives a warning to the outside (e.g., the hosts 113 and 123). The monitor host 132 can register information on image forming apparatuses to be monitored (managed) by the hosts 113 and 123, and settings associated with monitoring (management). The monitor host 132 merges and manages at once the information on image forming apparatuses to be monitored that are registered from the hosts 113 and 123, and the settings associated with monitoring. The monitor host 132 can make settings associated with monitoring in the monitor apparatuses 153, 167, and 168 and the image forming apparatus 171.

The operation information includes information representing the absence of toner, open door, exchange of the drum, the presence/absence of the cartridge, cooling fan abnormality, board abnormality, contamination of the document table glass, the absence of staples, and shortage of the light quantity of the paper feed sensor. The operation information also includes information representing overflow of the font memory, rendering error, fixing unit abnormality, double-sided unit abnormality, and a paper jam. The operation information further includes counter information (e.g., a charging counter for charging, a department counter totaled for each department of a customer, a size counter totaled for each paper size, and a component counter representing the degree of consumption of a component in an image forming apparatus). In the embodiment, the charging counter represents the printing count of an image forming apparatus. The department counter represents a printing count for each department set by a customer. The component counter represents, for example, the number of rotations for a drum or the time (sec) for a scanner lamp.

The monitor host 132 provides a Web page to the PCs 112 and 122, monitor apparatuses 153, 167, and 168, and image forming apparatus 171 which are connected via the Internet, in order to browse information stored in the database 131 or processed information. Note that the monitor host 132 provides a Web page by limiting browsing contents for each monitor company, each customer, and each user authority based on user authentication. The monitor host 132 may provide a Web page so that part of information can be changed from the Web page.

The distribution system 140 includes a database 141 and distribution server 142, and is interposed between the system of the monitor company and that of a customer. In the distribution system 140, the database 141 and distribution server 142 are connected by a LAN 143. The LAN 143 is connectable to the Internet. The LANs 143 and 133 may be formed from a single LAN.

The database 141 stores (accumulates), for example, firmware, an application, and software license information for an image forming apparatus to be monitored. The database 141 may physically exist in the distribution server 142. The database 141 may also reside at another location via the Internet as long as it can be accessed (communicate with) from the distribution server 142. The database 141 may share information (data) with the database 131.

FIG. 1 shows only one database 131 and one monitor host 132 in the monitor system 130 and only one database 141 and one distribution server 142 in the distribution system 140. In practice, however, the monitor system 130 includes a plurality of databases and a plurality of monitor hosts, and the distribution system 140 includes a plurality of databases and a plurality of distribution servers in order to distribute the load of obtaining (collecting) information from many image forming apparatuses and many monitor apparatuses and distributing firmware and the like.

Next, systems on the customer side will be explained. The image forming systems 150, 160, and 170 serving as systems on the customer sides have different environments.

The image forming system 150 is a system for, for example, business office X of company A. The image forming system 150 includes image forming apparatuses 151 and 152 and the monitor apparatus 153. The image forming apparatuses 151 and 152 are connected to a LAN 154 connected to the Internet, and monitored by the monitor apparatus 153. The monitor apparatus 153 can communicate with the monitor host 132 via the Internet. Every time the monitor apparatus 153 receives information (e.g., generation of a failure) on the image forming apparatuses 151 and 152 from them, it transmits the information to the monitor host 132.

The monitor apparatus 153 is connected to a database (not shown), and stores (accumulates), in it, information (e.g., operation information) obtained (collected) from the image forming apparatuses 151 and 152 and the result of processing the information. The database (not shown) also stores settings concerning monitoring of the image forming apparatuses 151 and 152. Note that the database (not shown) may be connected to the LAN 154 and exist independently. The database may also reside at another location via the Internet as long as it can be accessed (communicate with) from the monitor apparatus 153.

The image forming system 160 is a system for, for example, business office Y of company A. The image forming system 160 includes image forming apparatuses 161 to 166 and the monitor apparatuses 167 and 168. The image forming apparatuses 161 to 166 are connected to a LAN 169 connected to the Internet, and monitored by the monitor apparatuses 167 and 168. In the embodiment, the monitor apparatus 167 monitors the image forming apparatuses 161 to 164, and the monitor apparatus 168 monitors the image forming apparatuses 165 and 166. The monitor apparatuses 167 and 168 can communicate with the monitor host 132 via the Internet. Every time the monitor apparatus 167 receives information (e.g., generation of a failure) on the image forming apparatuses 161 to 164 from them, it transmits the information to the monitor host 132. Similarly, every time the monitor apparatus 168 receives information (e.g., generation of a failure) on the image forming apparatuses 165 and 166 from them, it transmits the information to the monitor host 132.

The monitor apparatuses 167 and 168 are connected to a database (not shown), and store (accumulate), in it, information (e.g., operation information) obtained (collected) from the image forming apparatuses 161 to 166 and the result of processing the information. The database (not shown) also stores settings concerning monitoring of the image forming apparatuses 161 to 166. Note that the database (not shown) may be connected to the LAN 169 and exist independently. The database may also reside at another location via the Internet as long as it can be accessed (communicate with) from the monitor apparatuses 167 and 168.

The image forming system 170 is a system for, for example, company B, and includes the image forming apparatus 171. The image forming apparatus 171 is connected to a LAN 172 connected to the Internet. The image forming apparatus 171 directly communicates with the monitor host 132 via the Internet, and positively transmits information (e.g., generation of a failure) on the image forming apparatus 171 to the monitor host 132. The image forming apparatus 171 incorporates a Web browser to allow browsing a Web page provided by the monitor host 132.

Communication via the Internet in the system 1 of the embodiment utilizes an HTTP/SOAP protocol. SOAP stands for Simple Object Access Protocol. SOAP is a protocol based on XML (eXtended Markup Language) to call data and services of a given computer from another computer.

In the embodiment, SOAP is implemented on HTTP. SOAP communication exchanges SOAP messages in which an XML document contains supplementary information. A SOAP-compliant computer includes a SOAP message generating unit which generates a SOAP message, and a SOAP message analyzing unit which analyzes a SOAP message. In the embodiment, operation information of an image forming apparatus is transmitted to the monitor host 132 by a SOAP message.

According to the embodiment, in the image forming systems 150 and 160, the image forming apparatuses 151 and 152 communicate with the monitor host 132 via the monitor apparatus 153, whereas the image forming apparatuses 161 to 166 communicate with the monitor host 132 via the monitor apparatuses 167 and 168. However, in the image forming systems 150 and 160 as well as the image forming system 170, the image forming apparatuses themselves can communicate with the monitor host without the mediacy of the monitor apparatus.

Figure 2:
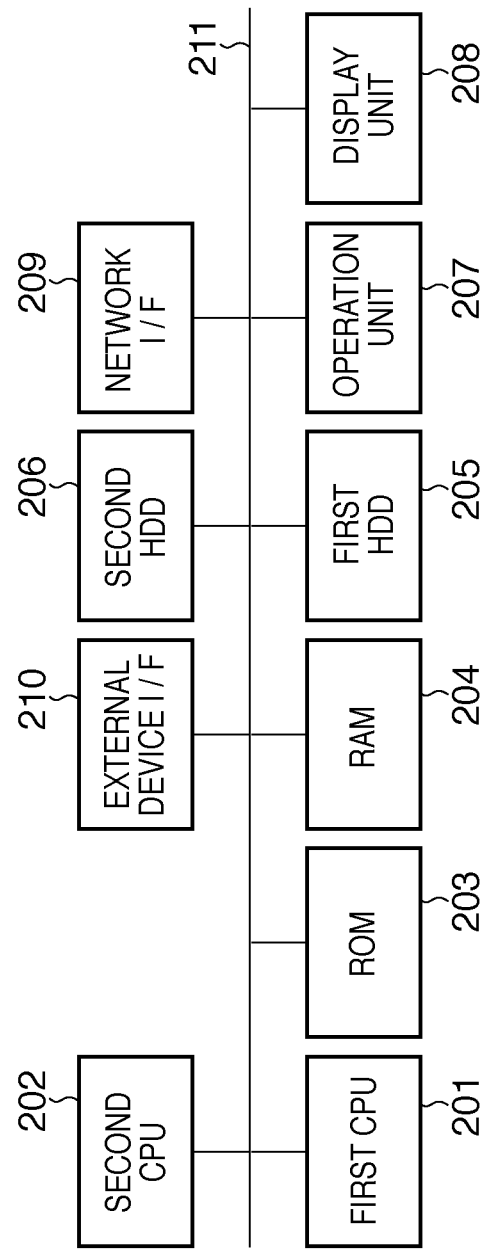
FIG. 2 is a block diagram exemplifying the hardware configuration of a host, monitor host, and distribution server in the system shown in FIG. 1.

FIG. 2 is a block diagram exemplifying the hardware configuration of the hosts 113 and 123, monitor host 132, and distribution server 142.

A first CPU 201 and second CPU 202 control processes in a corresponding apparatus. A ROM (Read Only Memory) 203 stores programs and data associated with processes in the apparatus. A RAM (Random Access Memory) 204 electrically stores temporary data associated with processes in the apparatus.

A first hard disk (HDD) 205 and second hard disk (HDD) store programs and data associated with processes in the apparatus, information on an image forming apparatus to be monitored, information obtained (collected) from an image forming apparatus, and the like. The first HDD 205 and second HDD store, for example, counter information (e.g., charging counter, department counter, and component counter).

An operation unit 207 includes a keyboard and pointing device for accepting an instruction input to the apparatus. A display unit 208 displays the operating status of the apparatus, and information output from each program running on the apparatus. A network interface (I/F) 209 is connected to a LAN and the Internet to exchange information (i.e., transmit and receive information (data)) with the outside. An external device interface (I/F) 210 connects an external device (e.g., external storage device).

A system bus 211 connects the first CPU 201, the second CPU 202, the ROM 203, the RAM 204, the first HDD 205, a second HDD 206, the operation unit 207, the display unit 208, the network I/F 209, and the external device I/F 210 to each other.

Figure 3:
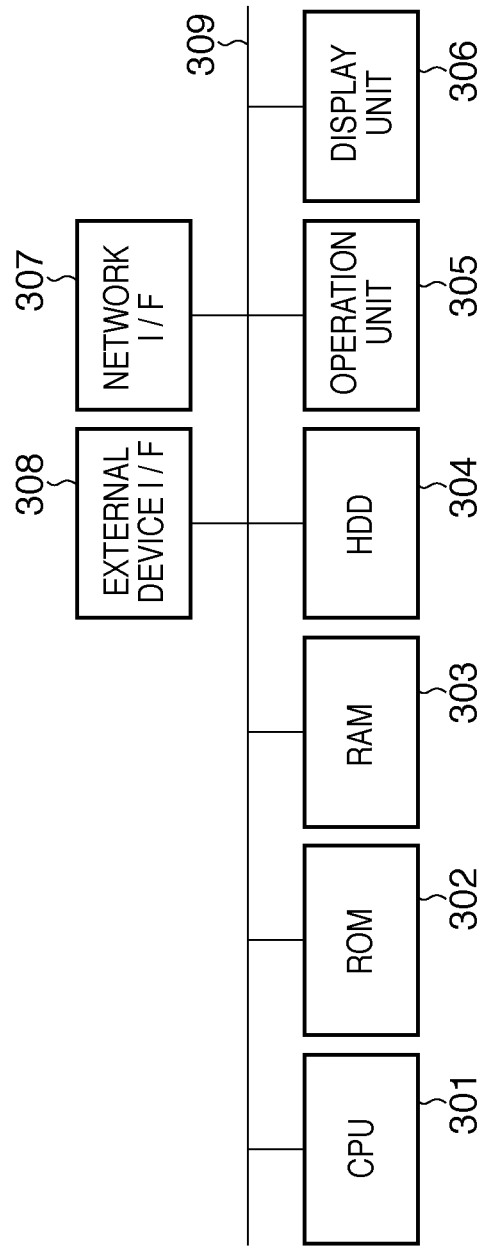
FIG. 3 is a block diagram exemplifying the hardware configuration of a PC and monitor apparatus in the system shown in FIG. 1.

FIG. 3 is a block diagram exemplifying the hardware configuration of the PCs 112 and 122, and monitor apparatuses 153, 167, and 168.

A CPU 301 controls processes in a corresponding apparatus. A ROM (Read Only Memory) 302 stores programs and data associated with processes in the apparatus. A RAM (Random Access Memory) 303 electrically stores temporary data associated with processes in the apparatus.

In each of the monitor apparatuses 153, 167, and 168, a hard disk (HDD) 304 stores programs and data associated with processes in the apparatus, information on an image forming apparatus to be monitored, information obtained (collected) from an image forming apparatus, and the like. In each of the PCs 112 and 122, the HDD 304 stores a Web browser and the like.

An operation unit 305 includes a keyboard and pointing device for accepting an instruction input to the apparatus. A display unit 306 displays the operating status of the apparatus, and information output from each program running on the apparatus. A network interface (I/F) 307 is connected to a LAN and the Internet to exchange information (i.e., transmit and receive information (data)) with the outside. An external device interface (I/F) 308 connects an external device (e.g., external storage device).

A system bus 309 connects the CPU 301, ROM 302, RAM 303, HDD 304, operation unit 305, display unit 306, network I/F 307, and external device I/F 308 to each other.

Figure 4:
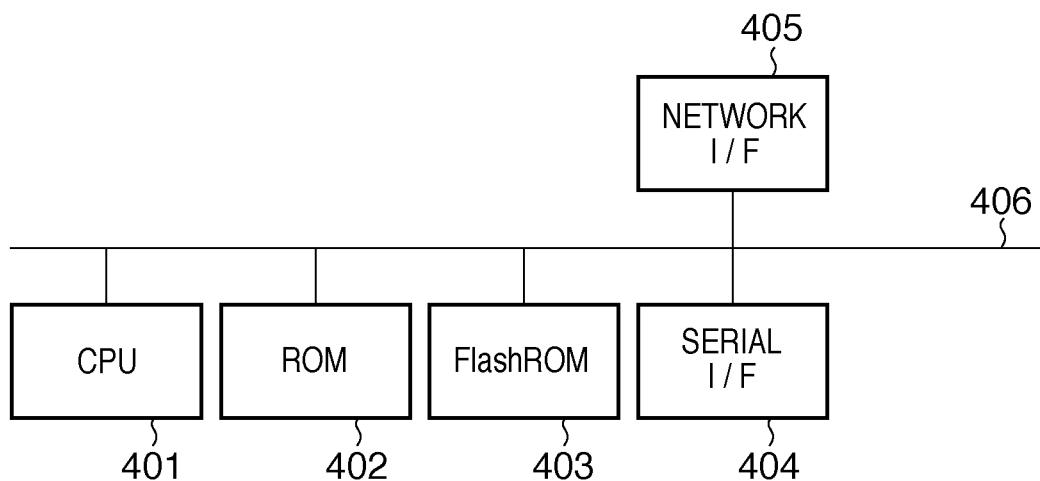
FIG. 4 is a block diagram showing another hardware configuration of the monitor apparatus in the system shown in FIG. 1.

FIG. 4 is a block diagram showing another hardware configuration of the monitor apparatuses 153, 167, and 168.

A CPU 401 controls processes in a corresponding apparatus. A ROM (Read Only Memory) 402 stores programs and data associated with processes in the apparatus.

A flash ROM 403 stores data associated with processes in the apparatus, temporary data, information on an image forming apparatus to be monitored, information obtained (collected) from an image forming apparatus, and the like.

A serial interface (I/F) 404 is connected to an external terminal via a serial cable. A network interface (I/F) 405 is connected to a LAN and the Internet to exchange information (i.e., transmit and receive information (data)) with the outside.

A system bus 406 connects the CPU 401, ROM 402, flash ROM 403, serial I/F 404, and network I/F 405 to each other.

Figure 5:
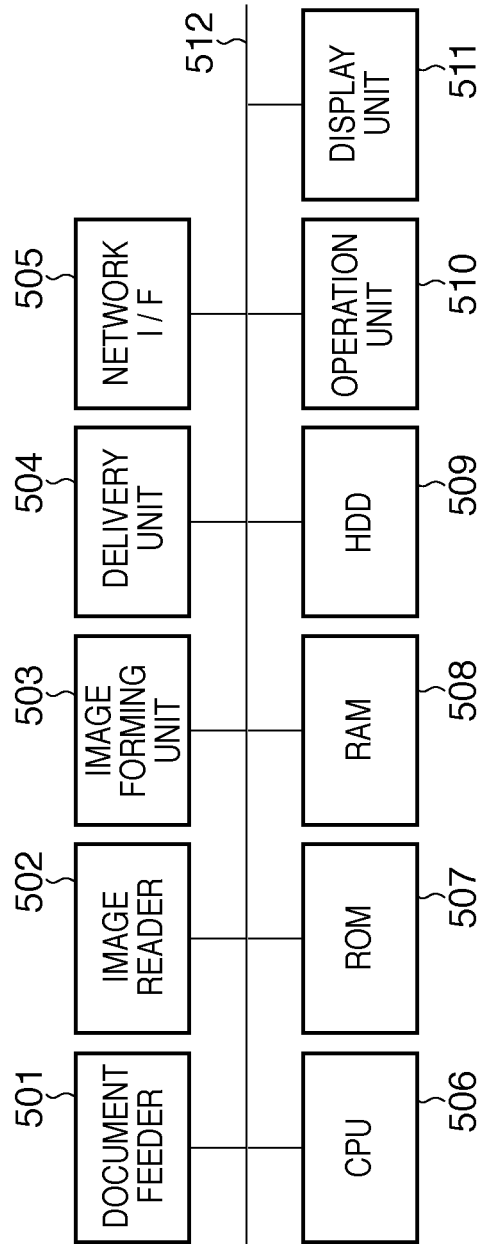
FIG. 5 is a block diagram exemplifying the hardware configuration of an image forming apparatus in the system shown in FIG. 1.

FIG. 5 is a block diagram exemplifying the hardware configuration of the image forming apparatuses 151, 152, 161 to 166, and 171. In the embodiment, the image forming apparatuses 151, 152, 161 to 166, and 171 are multifunctional peripherals including the printer function and facsimile function. The image forming apparatuses 151, 152, 161 to 166, and 171 may be printers or facsimile apparatuses, each of which receives image data from an information processing apparatus and prints (forms) an image by electrophotography or inkjet printing.

An image reader 502 reads an image sent from a document feeder 501. An image forming unit 503 converts the image read by the image reader 502 or image data received via a network into a print image, and prints it out. A delivery unit 504 delivers a print sheet bearing the printed (formed) image on it, and executes processes such as sorting and stapling.

A network interface (I/F) 505 is connected to a LAN and the Internet to exchange information (i.e., transmit and receive information (data)) with the outside.

A CPU 506 controls processes in the apparatus. For example, the CPU 506 monitors the operating state of the image forming apparatus. When a specific event such as a failure occurs, the CPU 506 transmits information on the event (operation information) to a predetermined destination (e.g., the monitor host or monitor apparatus).

A ROM (Read Only Memory) 507 stores programs and data associated with processes in the apparatus. A RAM (Random Access Memory) 508 electrically stores temporary data associated with processes in the apparatus.

A hard disk (HDD) 509 stores programs and data associated with processes in the apparatus, user data transmitted to the image forming apparatus, and the like.

An operation unit 510 includes a keyboard and pointing device for accepting an instruction input to the apparatus. A display unit 511 displays the operating status of the apparatus, and information output from each program running on the apparatus.

A system bus 512 connects the document feeder 501, image reader 502, image forming unit 503, delivery unit 504, network I/F 505, CPU 506, ROM 507, RAM 508, HDD 509, operation unit 510, and display unit 511 to each other.

Note that the image forming apparatus 171 has a function of positively transmitting information on it. The ROM 507 or HDD 509 stores a program concerning the processing of transmitting information.

Figure 6:
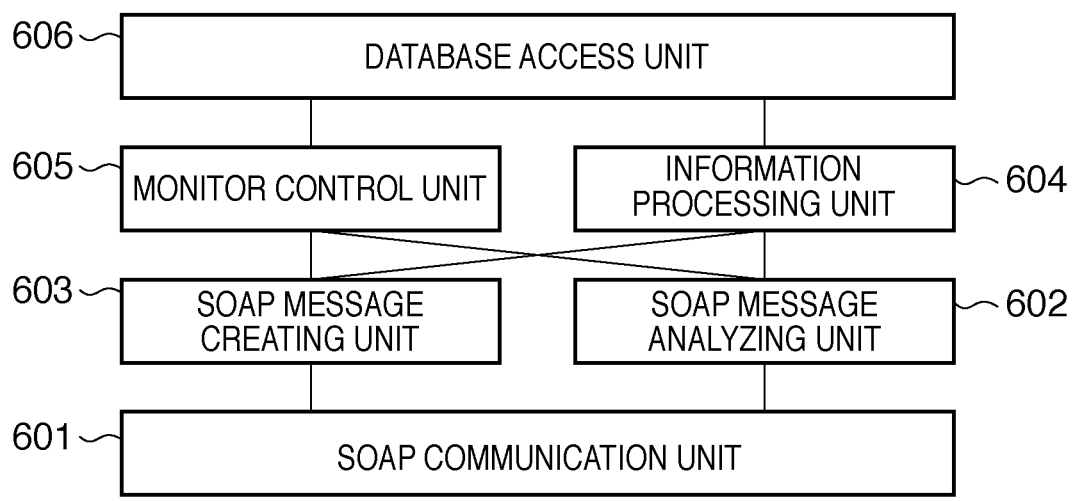
FIG. 6 is a block diagram exemplifying a software configuration associated with monitoring (management) of the image forming apparatus in the monitor host and distribution server in the system shown in FIG. 1.

FIG. 6 is a block diagram exemplifying a software configuration associated with monitoring (management) of the image forming apparatus in the monitor host 132 and distribution server 142.

A SOAP communication unit 601 transfers, to a SOAP message analyzing unit 602, a SOAP message received from the monitor apparatus 153, 167, or 168 or image forming apparatus 171 via the network I/F 209. The SOAP communication unit 601 transmits a SOAP message created by a SOAP message creating unit 603 to the monitor apparatus 153, 167, or 168 or image forming apparatus 171 via the network I/F 209.

An information processing unit 604 stores information received from the monitor apparatus 153, 167, or 168 or image forming apparatus 171 directly or upon processing in the database 131 or 141 via a database access unit 606.

The information processing unit 604 implements functions concerning a remote monitor system. Based on information received from the monitor apparatus 153, 167, or 168 or image forming apparatus 171 or information stored in the database 131 or 141, the information processing unit 604 notifies a serviceman or an administrator on the customer side of counter information, error information, and latest firmware information.

A monitor control unit 605 manages a schedule for obtaining information of the monitor apparatus 153, 167, or 168 or image forming apparatus 171, and controls the monitor contents and monitor method. If necessary, the monitor control unit 605 transmits an instruction to the monitor apparatus 153, 167, or 168 or image forming apparatus 171 via the SOAP message creating unit 603, SOAP communication unit 601, and network I/F 209.

Figure 7:
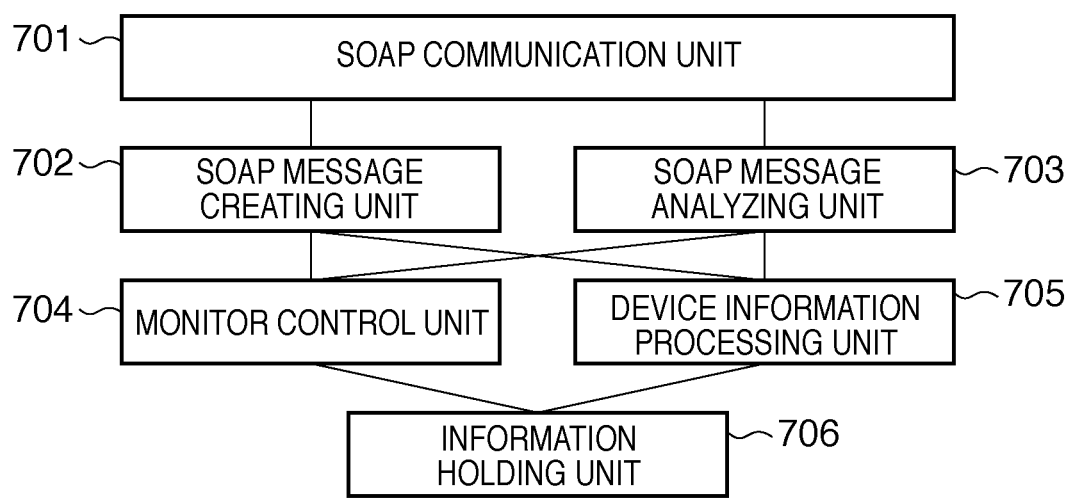
FIG. 7 is a block diagram exemplifying a software configuration associated with monitoring (management) of the image forming apparatus in the monitor apparatus in the system shown in FIG. 1.

FIG. 7 is a block diagram exemplifying a software configuration associated with monitoring (management) of the image forming apparatus in the monitor apparatuses 153, 167, and 168.

A SOAP communication unit 701 transfers, to a SOAP message analyzing unit 703, a SOAP message received from the monitor host 132 via the network I/F 307 or 405. The SOAP communication unit 701 transmits a SOAP message created by a SOAP message creating unit 702 to the monitor host 132 or distribution server 142 via the network I/F 307 or 405.

In accordance with monitor settings from the monitor host 132, a monitor control unit 704 updates information of an image forming apparatus that is held in an information holding unit 706, and manages a schedule for obtaining information of an image forming apparatus.

According to the schedule managed by the monitor control unit 704, a device information processing unit 705 stores, in the information holding unit 706, operation information obtained from an image forming apparatus. Data held in the information holding unit 706 is transferred to the SOAP message creating unit 702 via the device information processing unit 705 directly or upon processing, and transmitted to the monitor host 132.

Figure 8:
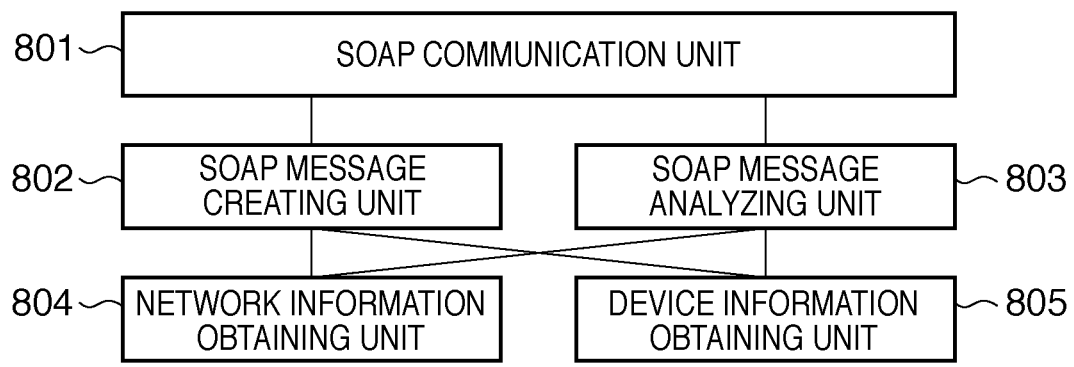
FIG. 8 is a block diagram exemplifying a software configuration associated with monitoring (management) of the image forming apparatus in the image forming apparatus in the system shown in FIG. 1.

FIG. 8 is a block diagram exemplifying a software configuration associated with monitoring (management) of the image forming apparatus in the image forming apparatuses 151, 152, 161 to 166, and 171.

A SOAP communication unit 801 transfers, to a SOAP message analyzing unit 803, a SOAP message received from the monitor host 132 or distribution server 142 via the network I/F 505. The SOAP communication unit 801 transmits a SOAP message created by a SOAP message creating unit 802 to the monitor host 132 or distribution server 142 via the network I/F 505.

A network information obtaining unit 804 automatically obtains an IP address, DNS server, and gateway address in the DHCP environment. When the HDD 509 stores network information input from the operation unit 510, the network information obtaining unit 804 obtains the network information.

A device information obtaining unit 805 obtains operation information (including information such as an internally generated service call) in accordance with an internal schedule or an instruction from the monitor host 132. Network information obtained by the device information obtaining unit 805 is transferred to the SOAP message creating unit 802 directly or upon processing and transmitted to the monitor host 132.

Figure 9:
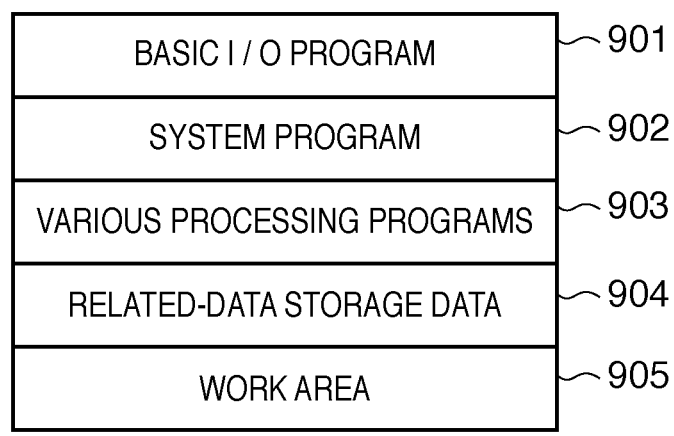
FIG. 9 is a view showing a memory map structure in the monitor host, distribution server, monitor apparatus, and image forming apparatus in the system shown in FIG. 1.

FIG. 9 is a view showing a memory map structure in the monitor host 132, distribution server 142, monitor apparatuses 153, 167, and 168, and image forming apparatuses 151, 152, 161 to 166, and 171. FIG. 9 shows a memory map when a program is loaded into the RAM 204 in the monitor host 132, the RAM 303 or flash ROM 403 in each of the monitor apparatuses 153, 167, and 168, or the RAM 508 in each of the image forming apparatuses 151, 152, 161 to 166, and 171.

As shown in FIG. 9, the memory map is formed from a basic I/O program 901, a system program 902, various processing programs 903, a related-data storage area 904, and a work area 905.

The basic I/O program 901 controls input/output in the apparatus. The system program 902 provides an operation environment to various processing programs. The related-data storage area 904 stores related data. The work area 905 is allocated for a program. Note that areas used for the basic I/O program 901 to work area 905 sometimes run short owing to a limited memory capacity. In this case, the first HDD 205 or second HDD 206 is used as a partial area of the RAM 204, the HDD 304 is used as that of the RAM 303, and the HDD 509 is used as that of the RAM 508.

Processing concerning distribution of firmware to the image forming apparatuses 151, 152, 161 to 166, and 171 and application of it in the system 1 will be explained.

Figure 10:
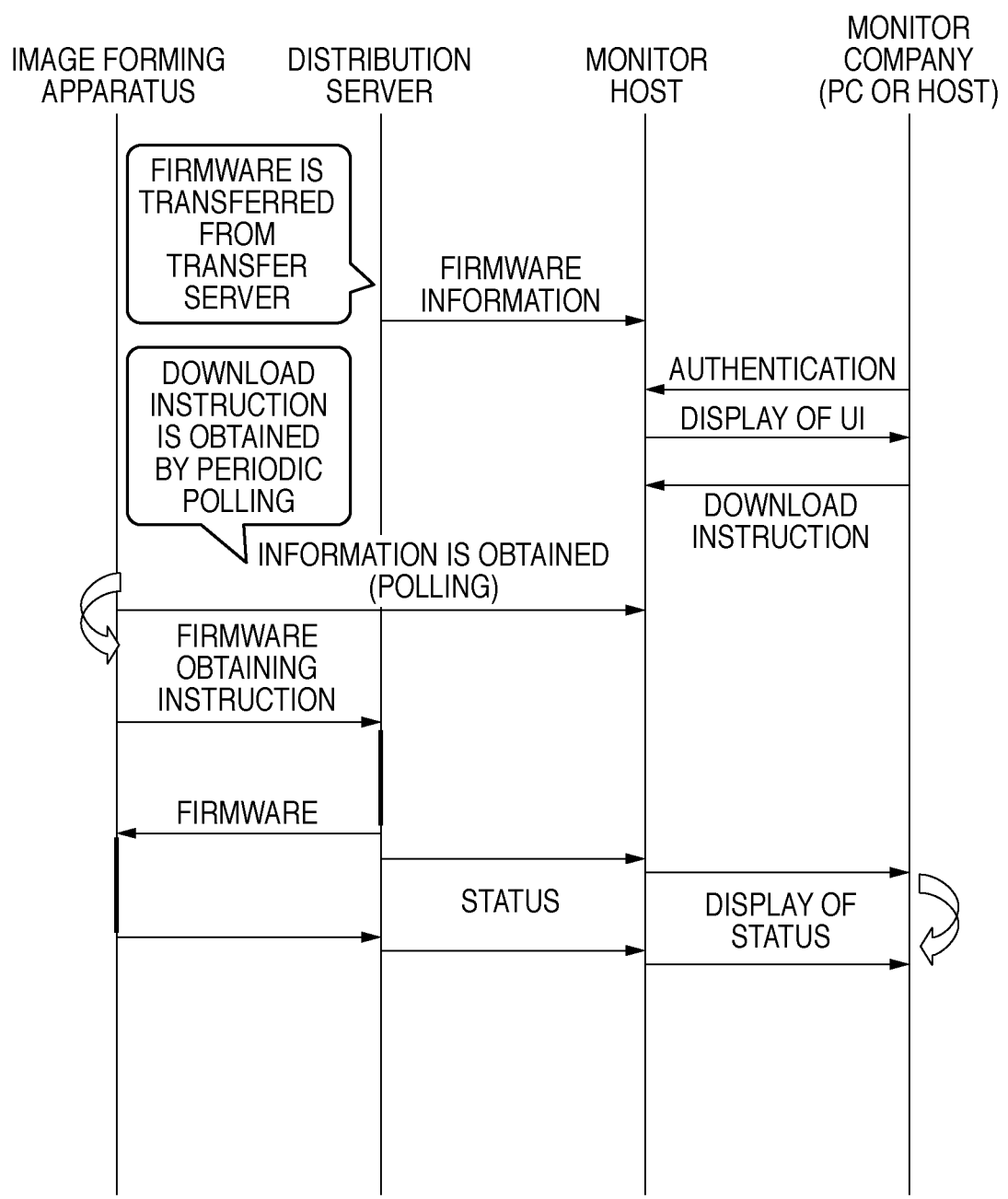
FIG. 10 is a chart for explaining a general firmware distribution sequence in the image forming apparatus, distribution server, monitor host, and monitor company in the system shown in FIG. 1.

A general firmware distribution sequence in the image forming apparatuses 151, 152, 161 to 166, and 171, distribution server 142, monitor host 132, and monitor company (including the PCs 112 and 122 and the hosts 113 and 123) will be described with reference to FIG. 10. The distribution server 142 is assumed to have received newly developed firmware in advance from a server (transfer server) for transferring firmware.

The distribution server 142 transmits information (firmware information) on firmware to the monitor host 132. The firmware information represents the type of image forming apparatus supported by firmware transferred to the distribution server 142, the version of firmware, and the like.

The monitor company (including the PCs 112 and 122 and the hosts 113 and 123) accesses the monitor host 132 for authentication. If the monitor host 132 authenticates the monitor company, it provides a UI display. The monitor company instructs a specific image forming apparatus to download firmware (download instruction) in order to update the firmware of the specific image forming apparatus.

Each image forming apparatus periodically obtains information from the monitor host 132 by polling. At this time, if the image forming apparatus receives a download instruction from the monitor company, it transmits an instruction to the distribution server 142 in accordance with the download instruction to obtain firmware designated by the download instruction.

The distribution server 142 distributes the firmware to the image forming apparatus in accordance with the firmware obtaining instruction from the image forming apparatus. If the image forming apparatus receives an instruction by polling to apply the firmware distributed (downloaded) from the distribution server 142, it applies the firmware.

The distribution server 142 transmits a firmware distribution status as a status to the monitor host 132. The monitor host 132 notifies the monitor company by display of the status transmitted from the distribution server 142.

When the firmware capacity is large, the distribution server 142 can divisionally distribute it. In this case, a series of firmware distribution operations is repeated a plurality of number of times.

A general sequence when the release of firmware distributed to the image forming apparatuses 151, 152, 161 to 166, and 171 is stopped and then terminated will be explained with reference to FIG. 11.

Release means permitting downloading of new firmware as trouble-free one for use. The stop of release means temporarily inhibiting downloading of new firmware as one which may cause an unexpected operation (i.e., causes a problem in use). The termination of release means inhibiting downloading of new firmware as one which may cause an unexpected operation.

Upon receiving firmware, each image forming apparatus transmits information on it (e.g., configuration settings and information of a connected accessory) to the distribution server 142. Assume that the release of the firmware distributed to the image forming apparatus is stopped and then terminated.

The image forming apparatus periodically obtains information from the monitor host 132 by polling. At this time, if the image forming apparatus receives an instruction information creation instruction addressed to the distribution server 142 to create instruction information, it transmits the instruction information creation instruction to the distribution server 142. The instruction information contains public information of firmware distributed to an image forming apparatus and is addressed to the image forming apparatus.

In response to the instruction information creation instruction from the image forming apparatus, the distribution server 142 creates instruction information and transmits it to the image forming apparatus. The image forming apparatus obtains the instruction information from the distribution server 142, and performs processing according to the instruction information. Creation of instruction information by the distribution server 142 and processing by the image forming apparatus upon obtaining the instruction information will be described in detail later.

Figure 12B:
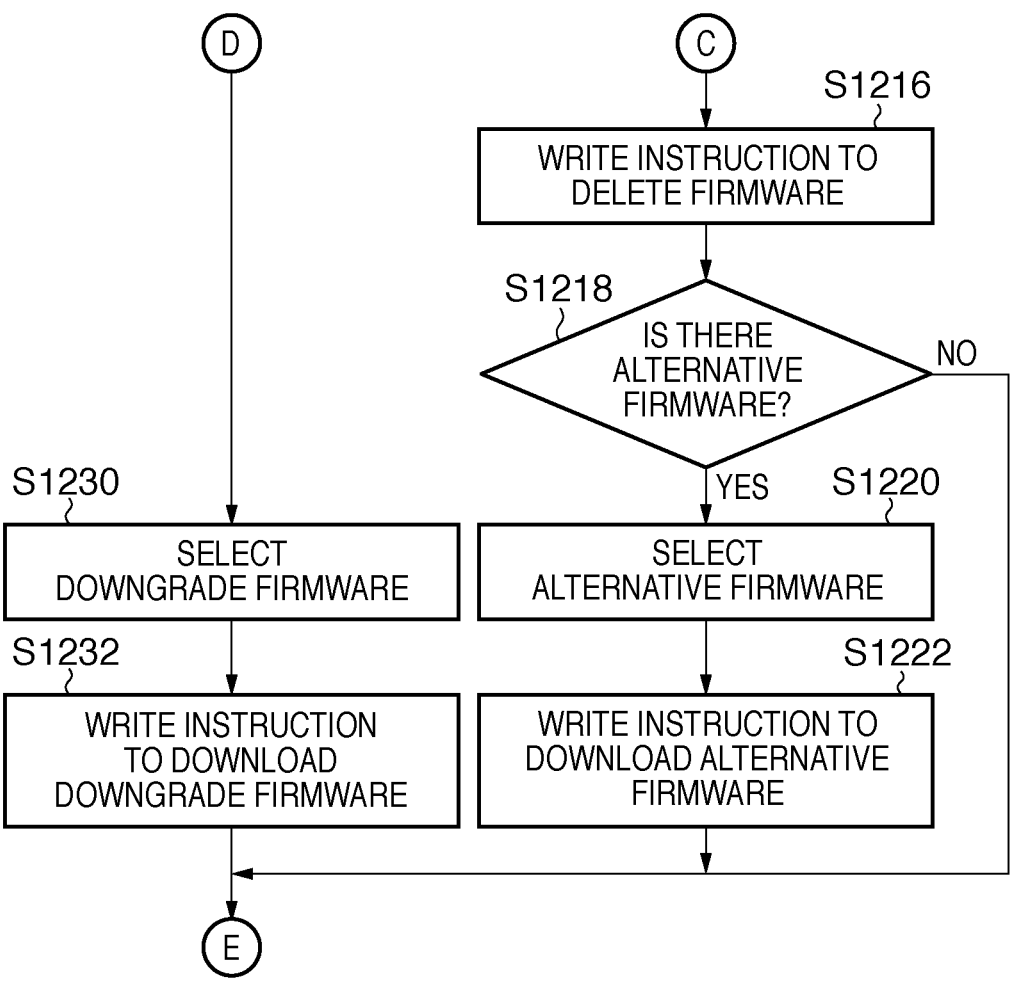

FIGS. 12A and 12B are flowcharts for explaining processing associated with creation of instruction information by the distribution server 142. As described above, the embodiment will exemplify a case in which the release of firmware distributed to an image forming apparatus is stopped and then terminated.

Referring to FIGS. 12A and 12B, it is determined in step S1202 whether the release of firmware distributed to an image forming apparatus is stopped. Assuming that the release of the firmware distributed to the image forming apparatus is terminated, the process advances to step S1204.

In step S1204, it is determined whether the release of the firmware distributed to the image forming apparatus is terminated. As described above, the release of the firmware distributed to the image forming apparatus is assumed to be terminated. Thus, the process advances to step S1206.

In other words, in steps S1202 and S1204, it is determined whether the firmware distributed to the image forming apparatus remains released (first determination).

If the release of the firmware distributed to the image forming apparatus is terminated, the release termination level of the firmware is checked. The release termination level represents the possibility at which given firmware causes an unexpected operation in an image forming apparatus. FIG. 13 is a view exemplifying the release termination level set in the embodiment. At the first level, a problem occurs in all image forming apparatuses. At the second level, a problem occurs in an image forming apparatus having a target configuration setting. Note that the configuration setting is a user-specific setting in each image forming apparatus. At the third level, a problem occurs when a target accessory is connected to an image forming apparatus.

In the embodiment, it is determined in step S1206 whether the release termination level of the firmware distributed to the image forming apparatus is the first level. If it is determined that the release termination level of the firmware distributed to the image forming apparatus is not the first level, the process advances to step S1208. If it is determined that the release termination level of the firmware distributed to the image forming apparatus is the first level, the process advances to step S1214.

In step S1208, it is determined whether the release termination level of the firmware distributed to the image forming apparatus is the second level. If it is determined that the release termination level of the firmware distributed to the image forming apparatus is the second level, the process advances to step S1210. If it is determined that the release termination level of the firmware distributed to the image forming apparatus is not the second level (i.e., is the third level), the process advances to step S1212.

In step S1210, it is determined whether the configuration setting in the image forming apparatus is the target configuration setting (target configuration setting for the second release termination level). If it is determined that the configuration setting in the image forming apparatus is the target one, the process advances to step S1214. If it is determined that the configuration setting in the image forming apparatus is not the target one, the process advances to step S1238.

In step S1212, it is determined whether the target accessory (target accessory for the third release termination level) is connected to the image forming apparatus. If it is determined that the target accessory is connected to the image forming apparatus, the process advances to step S1214. If it is determined that the target accessory is not connected to the image forming apparatus, the process advances to step S1238.

In step S1214, it is determined whether the firmware (release of which is terminated) distributed from the distribution server 142 has been applied to the image forming apparatus. Step S1214 is processing to determine whether the firmware distributed to the image forming apparatus has been applied, that is, updated. The distribution server 142 manages the status, so whether the firmware distributed to the image forming apparatus has been applied suffices to be determined based on information on the image forming apparatus. If it is determined that the firmware, the release of which is terminated, has not been applied to the image forming apparatus, the process advances to step S1216. If it is determined that the firmware, the release of which is terminated, has been applied to the image forming apparatus, the process advances to step S1224.

In step S1216, an instruction is written to delete the firmware (release of which is terminated) distributed from the distribution server 142. Step S1216 is processing to write, in the RAM 204 as instruction information to the image forming apparatus, an instruction to delete firmware. This processing precedes creation of instruction information.

In step S1218, it is determined whether there is alternative firmware to the firmware (release of which is terminated) distributed from the distribution server 142. If improved firmware exists in firmware programs managed by the distribution server 142, it is determined that there is alternative firmware, and the process advances to step S1220. If no improved firmware exists in firmware programs managed by the distribution server 142, it is determined that there is no alternative firmware, and the process advances to step S1238.

In step S1220, alternative firmware is selected from firmware programs managed by the distribution server 142.

In step S1222, an instruction is written to download the alternative firmware selected in step S1220. Step S1222 is processing to write, in the RAM 204 as instruction information to the image forming apparatus, an instruction to download alternative firmware. This processing precedes creation of instruction information.

In step S1224 as in step S1218, it is determined whether there is alternative firmware to the firmware (release of which is terminated) distributed from the distribution server 142. If it is determined that there is alternative firmware, the process advances to step S1226. If it is determined that there is no alternative firmware, the process advances to step S1230.

In step S1226, similar to step S1220, alternative firmware is selected from firmware programs managed by the distribution server 142.

In step S1228, similar to step S1222, an instruction is written to download the alternative firmware selected in step S1226.

In step S1230, downgrade firmware with respect to firmware, the release of which is terminated, is selected from firmware programs managed by the distribution server 142.

In step S1232, an instruction is written to download the downgrade firmware selected in step S1230. Step S1232 is processing to write, in the RAM 204 as instruction information to the image forming apparatus, an instruction to download downgrade firmware. This processing precedes creation of instruction information.

If it is determined in step S1202 that the release of the firmware distributed to the image forming apparatus is stopped, the process advances to step S1234.

In step S1234, it is determined whether the firmware (release of which is stopped) distributed from the distribution server 142 has been applied to the image forming apparatus. If it is determined that the firmware, the release of which is stopped, has not been applied to the image forming apparatus, the process advances to step S1236. If it is determined that the firmware, the release of which is stopped, has been applied to the image forming apparatus, the process advances to step S1224.

In step S1236, an instruction is written to suspend application of the firmware (release of which is stopped) distributed from the distribution server 142. Step S1236 is processing to write, in the RAM 204 as instruction information to the image forming apparatus, an instruction to suspend application of firmware. This processing precedes creation of instruction information.

In step S1238, the instruction written in the RAM 204 is created as instruction information. The instruction information contains the release state of the firmware. In the embodiment, the instruction information containing the instruction written in the RAM 204 is created as a SOAP message. FIG. 14 is a view exemplifying a SOAP message created in step S1238. The SOAP message shown in FIG. 14 is an instruction to delete firmware distributed to an image forming apparatus.

The body of the SOAP message shown in FIG. 14 will be explained. In the embodiment, the image forming apparatus polls the distribution server 142 periodically. The polling request is called getReservationList. In response to getReservationList from the image forming apparatus, the distribution server transmits the SOAP message shown in FIG. 14 to the image forming apparatus. OperationList is stored as an argument of getReservationList. A firmware delete instruction (Delete Download Firm) is stored as Operation.

Figure 15A:
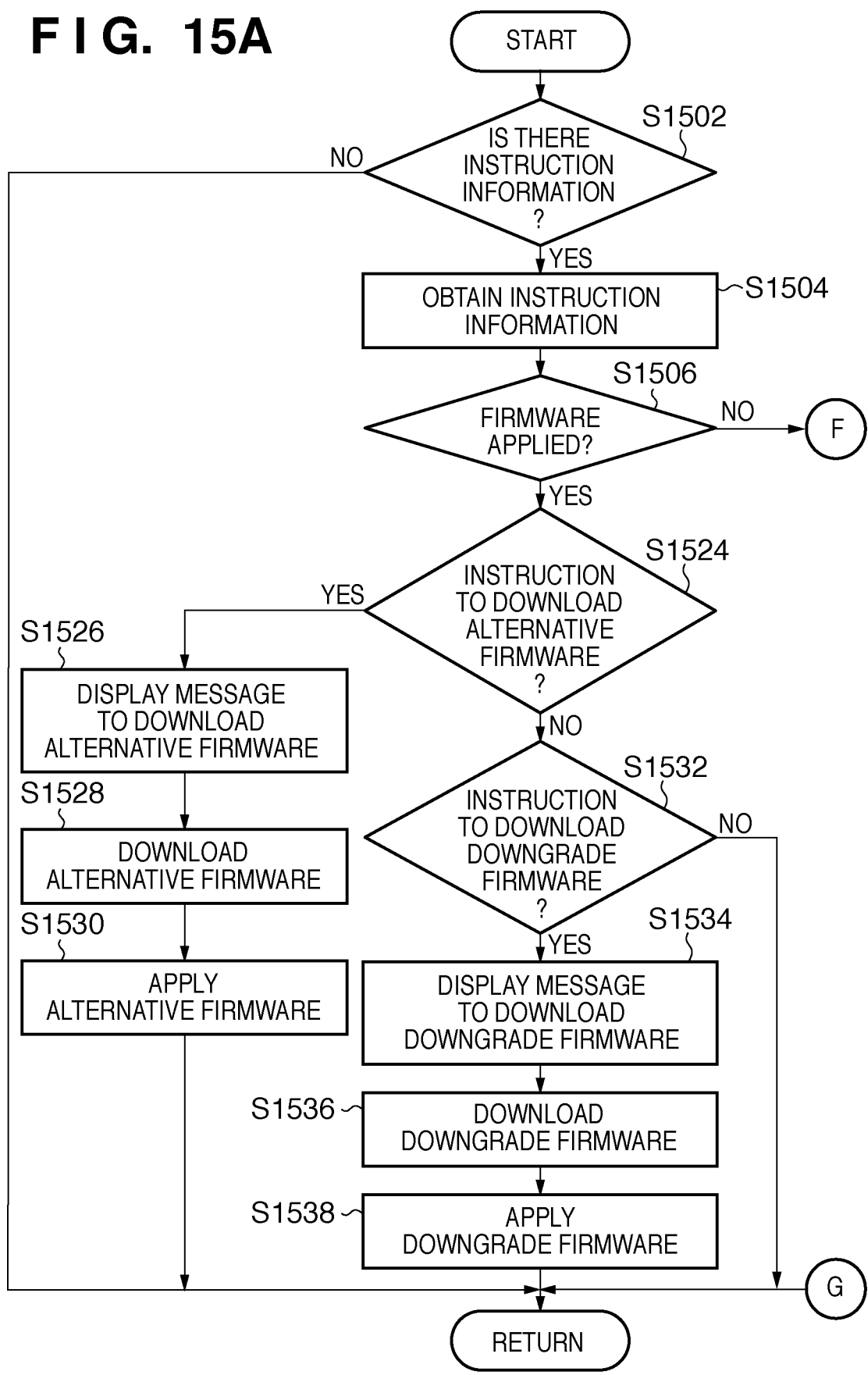

FIGS. 15A and 15B are flowcharts for explaining processing by the image forming apparatuses 151, 152, 161 to 166, and 171 after the distribution server 142 distributes firmware. The update control unit of each of the image forming apparatuses 151, 152, 161 to 166, and 171 executes the processing, as shown in FIG. 16. FIG. 16 is a view showing the software configuration of the image forming apparatuses 151, 152, 161 to 166, and 171.

Referring to FIGS. 15A and 15B, the update control unit determines in step S1502 whether there is instruction information from the distribution server 142. If the release of firmware distributed to the image forming apparatus or that of firmware applied to the image forming apparatus is stopped or terminated, the distribution server 142 creates instruction information containing the release status of the firmware. In this case, it is determined that there is instruction information. If there is instruction information from the distribution server 142, the process advances to step S1504. If the update control unit determines that there is no instruction information from the distribution server 142, the process ends.

In step S1504, the update control unit obtains the instruction information from the distribution server 142. In the embodiment, the image forming apparatus obtains the SOAP message shown in FIG. 14 as the instruction information from the distribution server 142, as described above.

As the processing to obtain instruction information (i.e., steps S1502 and S1504), the image forming apparatus may automatically obtain instruction information from the distribution server 142 within a predetermined period or instruction information from the distribution server 142 in accordance with a user instruction.

In step S1506, the update control unit determines based on the instruction information obtained in step S1504 whether firmware which is not released now, that is, the release of which is stopped or terminated, has been applied (updated) (second determination). If the update control unit determines that the firmware not released now has not been applied, the process advances to step S1508.

In step S1508, the update control unit determines whether the instruction information obtained in step S1504 is an instruction to suspend application of the firmware (which is not released now) distributed from the distribution server 142. As described above, if the release of firmware is stopped, the distribution server 142 creates, as instruction information, an instruction to suspend application of the firmware. In this case, it is determined that the instruction information is an instruction to suspend application of the firmware. If the update control unit determines that the instruction information is an instruction to suspend application of the firmware, the process advances to step S1510. If the update control unit determines that the instruction information is not an instruction to suspend application of the firmware, the process advances to step S1512.

In step S1510, the update control unit suspends application of the firmware (release of which is stopped) distributed from the distribution server 142. In other words, step S1510 prevents application of firmware when the release of the firmware distributed from the distribution server 142 is stopped.

In step S1512, the update control unit determines whether the instruction information obtained in step S1504 is an instruction to delete the firmware (which is not released now) distributed from the distribution server 142. As described above, if the release of firmware is terminated, the distribution server 142 creates, as instruction information, an instruction to delete the firmware. In this case, it is determined that the instruction information is an instruction to delete the firmware. If the update control unit determines that the instruction information is an instruction to delete the firmware, the process advances to step S1514. If the update control unit determines that the instruction information is not an instruction to delete the firmware, the process ends.

In step S1514, the update control unit displays a message to delete the firmware (release of which is terminated) distributed from the distribution server 142. For example, the display unit 511 displays a window representing a message to delete firmware, the release of which is terminated ("The release of downloaded firmware was terminated. The downloaded firmware will be deleted."), as shown in FIG. 17.

In step S1516, the update control unit deletes the firmware (release of which is terminated) distributed from the distribution server 142. In other words, step S1516 prevents application of firmware when the release of the firmware distributed from the distribution server 142 is terminated.

In step S1518, the update control unit determines whether the instruction information obtained in step S1504 is an instruction to download alternative firmware to the firmware, the release of which is terminated. As described above, if there is alternative firmware to the firmware, the release of which is terminated, the distribution server 142 creates, as instruction information, an instruction to download the alternative firmware. In this case, it is determined that the instruction information is an instruction to download the alternative firmware. If the update control unit determines that the instruction information is an instruction to download the alternative firmware, the process advances to step S1520. If the update control unit determines that the instruction information is not an instruction to download the alternative firmware, the process ends.

In step S1520, the update control unit displays a message to download (obtain) the alternative firmware to the firmware, the release of which is terminated.

In step S1522, the update control unit downloads (obtains) the alternative firmware to the firmware, the release of which is terminated.

If the update control unit determines in step S1506 that the firmware not released now has been applied, the process advances to step S1524.

In step S1524 as in step S1518, the update control unit determines whether the instruction information obtained in step S1504 is an instruction to download alternative firmware to the firmware not released now. If the update control unit determines that the instruction information is an instruction to download the alternative firmware, the process advances to step S1526.

In step S1526 as in step S1520, the update control unit displays a message to download (obtain) the alternative firmware to the firmware not released now.

In step S1528, similar to step S1522, the update control unit downloads (obtains) the alternative firmware to the firmware not released now.

In step S1530, the update control unit applies the alternative firmware downloaded (obtained) in step S1528.

If the update control unit determines in step S1524 that the instruction information is not an instruction to download the alternative firmware, the process advances to step S1532.

In step S1532, the update control unit determines whether the instruction information obtained in step S1504 is an instruction to download downgrade firmware with respect to the firmware not released now. As described above, if there is no alternative firmware to firmware not released now, the distribution server 142 creates, as instruction information, an instruction to download downgrade firmware. In this case, it is determined that the instruction information is an instruction to download the downgrade firmware. If the update control unit determines that the instruction information is an instruction to download the downgrade firmware, the process advances to step S1534. If the update control unit determines that the instruction information is not an instruction to download the downgrade firmware, the process ends.

In step S1534, the update control unit displays a message to download (obtain) the downgrade firmware with respect to the firmware not released now.

In step S1536, the update control unit downloads (obtains) the downgrade firmware with respect to the firmware not released now.

In step S1538, the update control unit applies the downgrade firmware downloaded (obtained) in step S1536.

Figure 18:
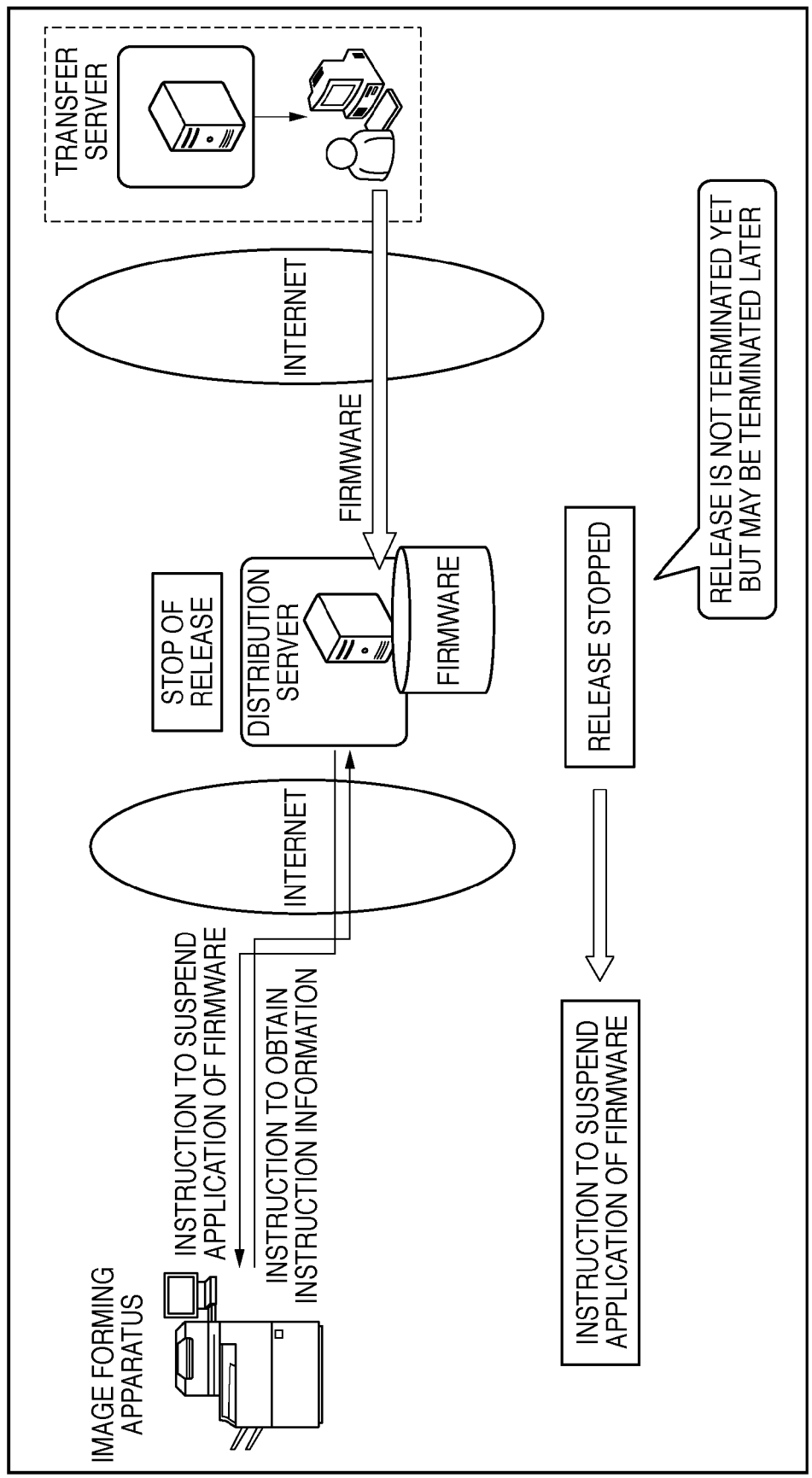
FIG. 18 is a view schematically showing the operation of the image forming apparatus in accordance with instruction information from the distribution server in the system shown in FIG. 1.
Figure 19:
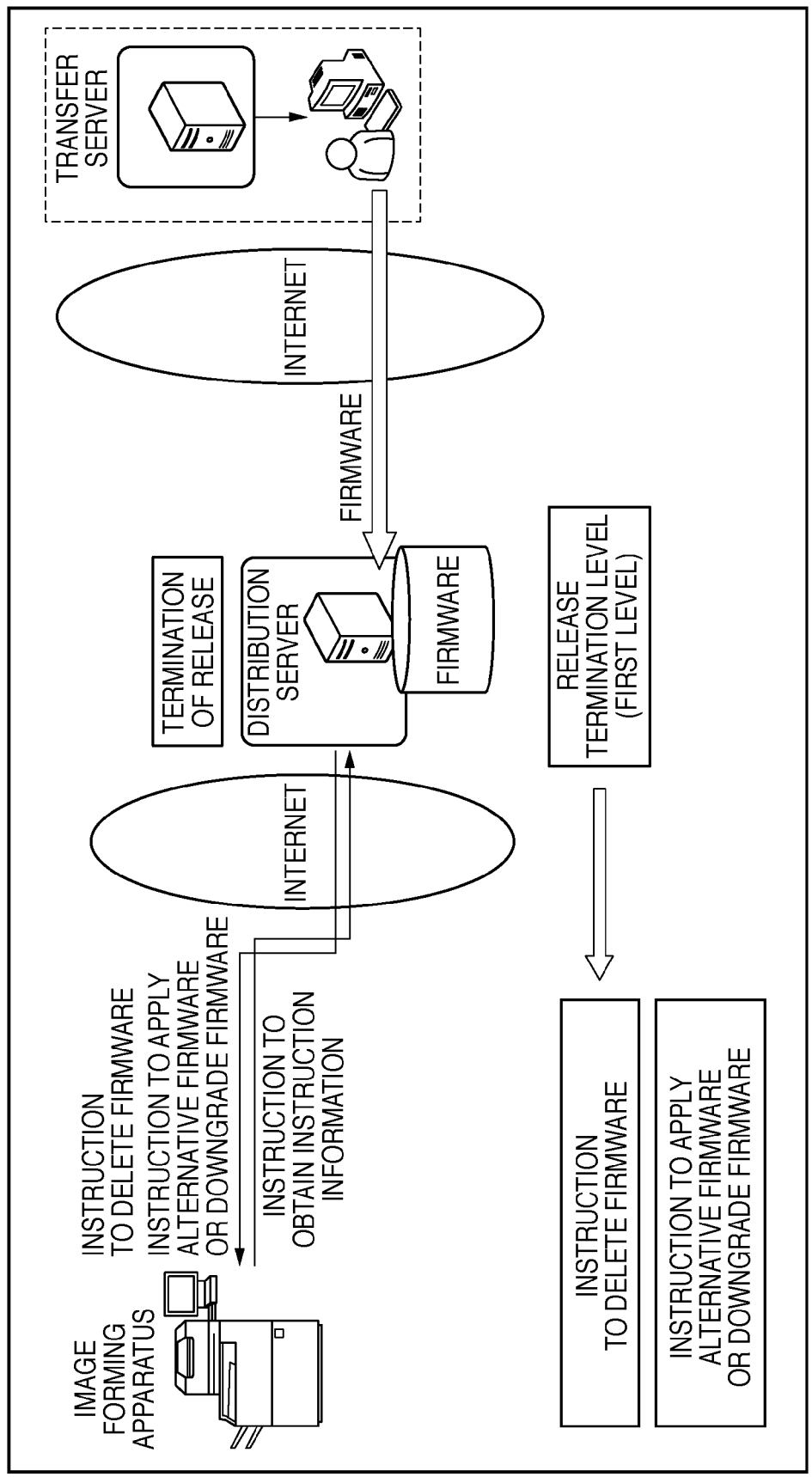
FIG. 19 is a view schematically showing the operation of the image forming apparatus in accordance with instruction information from the distribution server in the system shown in FIG. 1.
Figure 20:
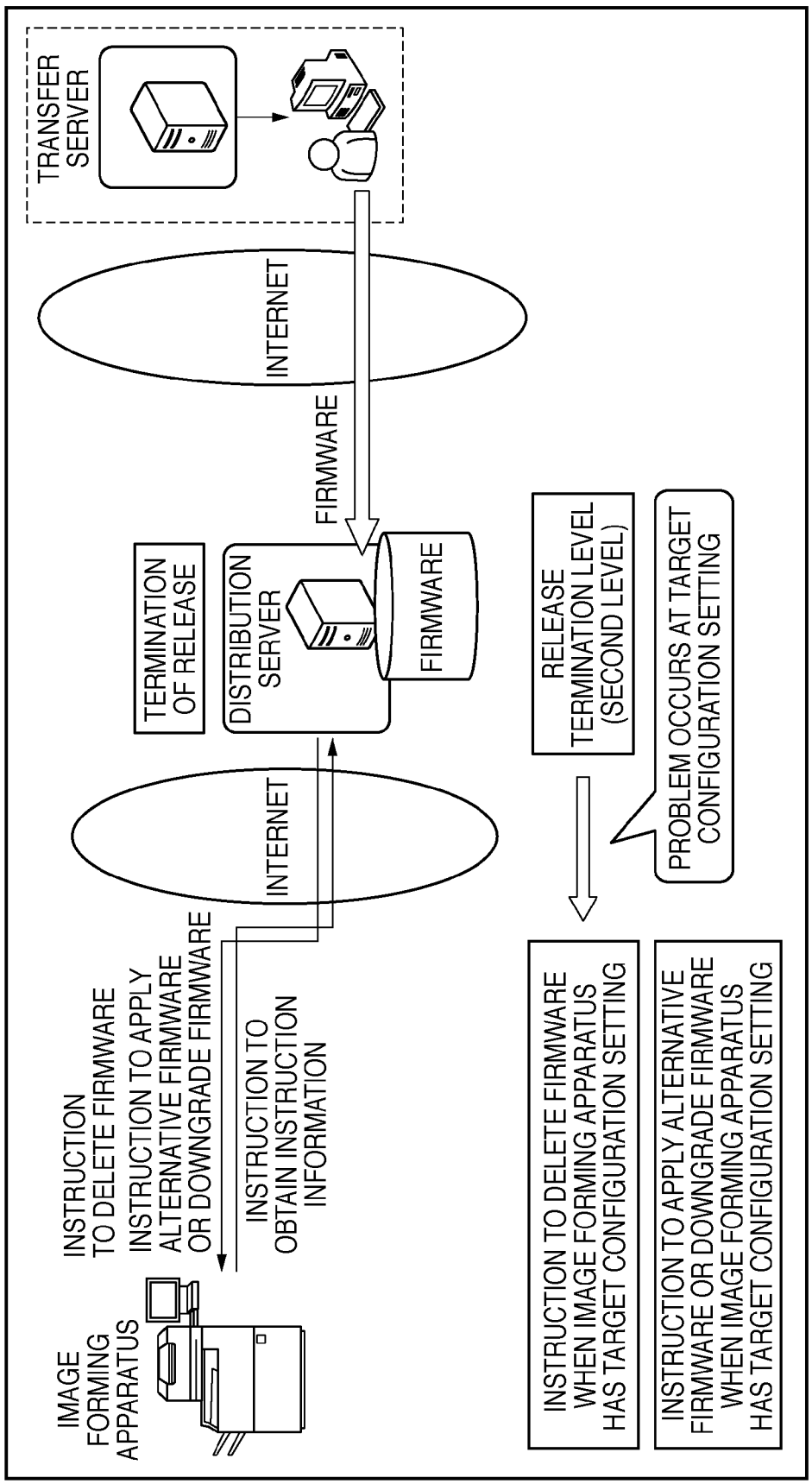
FIG. 20 is a view schematically showing the operation of the image forming apparatus in accordance with instruction information from the distribution server in the system shown in FIG. 1.

FIGS. 18 to 21 show operations of the image forming apparatus in accordance with instruction information from the distribution server 142. FIG. 18 shows the operation of the image forming apparatus when the release of firmware distributed to the image forming apparatus is stopped. FIG. 19 shows the operation of the image forming apparatus when the release of firmware distributed to the image forming apparatus is terminated (first release termination level). FIG. 20 shows the operation of the image forming apparatus when the release of firmware distributed to the image forming apparatus is terminated (second release termination level). FIG. 21 shows the operation of the image forming apparatus when the release of firmware distributed to the image forming apparatus is terminated (third release termination level).

In this way, the embodiment can prevent application of firmware which is not released now (release of which is stopped or terminated), or use of an image forming apparatus while the firmware is kept applied.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

The present invention is not limited to updating of firmware of an image forming apparatus, and is also applicable to updating of an application of an image forming apparatus and updating of firmware, an application, or the like of another apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2008-251686 filed on Sep. 29, 2008, which is hereby incorporated by reference herein in its entirety.

What is claimed is:

1. A system comprising an image forming apparatus and a server that distributes firmware to said image forming apparatus, said server comprising:
a first determination unit configured to determine whether the firmware distributed to said image forming apparatus is to be released at a current time; and
a transmission unit configured to, when firmware determined by said first determination unit not to be released at the current time has not been applied to said image forming apparatus, transmit first instruction information that contains an instruction to prevent application of the firmware to said image forming apparatus, and when the firmware determined by said first determination unit not to be released at the current time has been applied to said image forming apparatus, transmit second instruction information that contains an instruction to obtain either firmware alternative to, or a downgrade from, the firmware determined not to be released at the current time, and apply the obtained firmware to said image forming apparatus, wherein said first determination unit further determines whether release of the firmware distributed to said image forming apparatus is stopped or terminated as firmware that may cause an unexpected operation, and wherein said first determination unit, when the release of the firmware distributed to said image forming apparatus is terminated, further determines a release termination level of the firmware, the release termination level representing the possibility at which the firmware causes an unexpected operation in the image forming apparatus, and said image forming apparatus comprising:

an obtaining unit configured to obtain instruction information from said server; and a control unit configured to prevent application of the firmware determined not to be released at the current time in accordance with the first instruction information obtained by said obtaining unit, wherein said control unit controls to obtain either firmware alternative to, or a downgrade from, the firmware determined not to be released at the current time in accordance with the second instruction information obtained by said obtaining unit, and apply the obtained firmware to said image forming apparatus.

2. The system according to claim 1, wherein said transmission unit transmits, when said first determination unit determines that the release termination level of the firmware is a first level at which a problem occurs in all image forming apparatuses, as the instruction information, an instruction to delete the firmware as long as the firmware has not been applied to said image forming apparatus, and an instruction to obtain either firmware alternative to, or a downgrade from, the firmware, and apply the obtained firmware as long as the firmware has been applied to said image forming apparatus.

3. The system according to claim 1, wherein said obtaining unit automatically obtains the instruction information from said server within a predetermined period of time.

4. The system according to claim 1, wherein said obtaining unit obtains the instruction information from said server in accordance with a user instruction.

5. The system according to claim 1, wherein said transmission unit transmits as instruction information, when said first determination unit determines that the release termination level of the firmware is a second level at which a problem occurs in an image forming apparatus having a target configuration setting, an instruction to delete the firmware as long as the firmware has not been applied to said image forming apparatus.

6. The system according to claim 1, wherein said transmission unit transmits as instruction information, when the said first determination unit determines that the release termination level of the firmware is a third level at which a problem occurs when a target accessory is connected to an image forming apparatus, an instruction to delete the firmware as long as the firmware has not been applied to said image forming apparatus.

7. A server that distributes firmware to an image forming apparatus, said server comprising:

a determination unit configured to determine whether the firmware distributed to said image forming apparatus is to be released at a current time; and a transmission unit configured to, when firmware determined by said determination unit not to be released at the current time has not been applied to said image forming apparatus, transmit first instruction information that contains an instruction to prevent application of the firmware to said image forming apparatus, and when the firmware determined by said determination unit not to be released at the current time has been applied to said image forming apparatus, transmit second instruction information that contains an instruction to obtain either firmware alternative to, or a downgrade from, the firmware determined not to be released at the current time, and apply the obtained firmware to said image forming apparatus, wherein said determination unit further determines whether release of the firmware distributed to said image forming apparatus is stopped or terminated as firmware that may cause an unexpected operation, and wherein said first determination unit, when the release of the firmware distributed to said image forming apparatus is terminated, further determines a release termination level of the firmware, the release termination level representing the possibility at which the firmware causes an unexpected operation in the image forming apparatus.

8. An image forming apparatus that communicates with a server that distributes firmware, said image forming apparatus comprising:

an obtaining unit configured to obtain instruction information addressed to said image forming apparatus that contains public information representing whether the firmware distributed from said server is released as trouble-free firmware for use; and a control unit configured to prevent application of firmware determined not to be released at a current time in accordance with the instruction information obtained by said obtaining unit, wherein said control unit controls to obtain either firmware alternative to, or a downgrade from, the firmware determined not to be released at the current time in accordance with the instruction information obtained by said obtaining unit, and apply the obtained firmware to said image forming apparatus, wherein said server determines whether release of the firmware distributed to said image forming apparatus is stopped or terminated as firmware that may cause an unexpected operation, and wherein said server, when the release of the firmware distributed to said image forming apparatus is terminated, further determines a release termination level of the firmware, the release termination level representing the possibility at which the firmware causes an unexpected operation in the image forming apparatus.

9. A method of controlling a system including an image forming apparatus and a server that distributes firmware to said image forming apparatus, said method comprising steps of:

determining whether the firmware distributed to said image forming apparatus is to be released at a current time;

transmitting, when firmware determined in said determining step not to be released at the current time has not been applied to said image forming apparatus, first instruction information that contains an instruction to prevent application of the firmware to said image forming apparatus, and when the firmware determined in said determining step not to be released at the current time has been applied to said image forming apparatus, second instruction information that contains an instruction to obtain either firmware alternative to, or a downgrade from, the firmware determined not to be released at the current time, and apply the obtained firmware to said image forming apparatus;

obtaining instruction information from said server; and controlling to prevent application of the firmware determined not to be released at the current time in accordance with the first instruction information obtained in the obtaining step, wherein said controlling step controls to obtain either firmware alternative to, or a downgrade from, the firmware determined not to be released at the current time in accordance with the second instruction information obtained in the obtaining step, and apply the obtained firmware to said image forming apparatus, wherein said determining step further determines whether release of the firmware distributed to said image forming apparatus is stopped or terminated as firmware that may cause an unexpected operation, and wherein said determining step, when the release of the firmware distributed to said image forming apparatus is terminated, further determines a release termination level of the firmware, the release termination level representing the possibility at which the firmware causes an unexpected operation in the image forming apparatus.

10. A non-transitory computer-readable storage medium storing a program that when executed causes a computer to perform a method of controlling a system including an image forming apparatus and a server that distributes firmware to said image forming apparatus, said method comprising steps of:

determining whether the firmware distributed to said image forming apparatus is released at a current time, transmitting, when firmware determined in said determining step not to be released at the current time has not been applied to said image forming apparatus, first instruction information that contains an instruction to prevent application of the firmware to said image forming apparatus, and when the firmware determined in said determining step not to be released at the current time has been applied to said image forming apparatus, instruction second information that contains an instruction to obtain either firmware alternative to, or a downgrade from, the firmware determined not to be released at the current time, and apply the obtained firmware to said image forming apparatus, obtaining instruction information from said server, and controlling to prevent application of the firmware determined not to be released at the current time in accordance with the first instruction information obtained in the obtaining step, wherein said controlling step controls to obtain either firmware alternative to, or a downgrade from, the firmware determined not to be released at the current time in accordance with the second instruction information obtained in the obtaining step and apply the obtained firmware to said image forming apparatus, wherein said determining step further determines whether release of the firmware distributed to said image forming apparatus is stopped or terminated as firmware that may cause an unexpected operation, and wherein said determining step, when the release of the firmware distributed to said image forming apparatus is terminated, further determines a release termination level of the firmware, the release termination level representing the possibility at which the firmware causes an unexpected operation in the image forming apparatus.

11. A system comprising an image forming apparatus and a server that distributes firmware to said image forming apparatus, said server comprising:

a first determination unit configured to determine whether or not the firmware distributed to said image forming apparatus is to be released at a current time, wherein the determination by the first determination unit is executed in anticipation of possibility of an unexpected operation of firmware; and a transmission unit configured to, when the firmware determined by said first determination unit not to be released at the current time has been applied to said image forming apparatus, transmit second instruction information that contains an instruction to obtain either firmware alternative to, or a downgrade from, the firmware determined not to be released at the current time, and apply the obtained firmware to said image forming apparatus, and said image forming apparatus comprising:

a first request unit configured to periodically transmit a first request to a monitoring system for managing operation information, the operation information including an error from said image forming apparatus and a notification indicative of a firmware distribution status from said server;

a second request unit configured to transmit a second request to said server when a response to the first request is an instruction for said server;

an obtaining unit configured to obtain instruction information from said server as a response to the second request; and a control unit configured to obtain either firmware alternative to, or a downgrade from, the firmware determined not to be released at the current time in accordance with the instruction information obtained by said obtaining unit, and to apply the obtained firmware to said image forming apparatus.

12. The system according to claim 11, wherein said transmission unit is configured to, when said first determination unit determines that the release of the firmware distributed to said image forming apparatus is stopped, transmit third instruction information obtained by said obtaining unit that contains an instruction to suspend application of the firmware as long as the firmware has not been applied to said image forming apparatus, and said control unit is configured to suspend application of the firmware, the release of which is stopped, in accordance with the third instruction information obtained by said obtaining unit.

13. The system according to claim 11, wherein said transmission unit is configured to, when said first determination unit determines that the release of the firmware distributed to said image forming apparatus is terminated, transmit fourth instruction information obtained by said obtaining unit that contains an instruction to delete the firmware as long as the firmware has not been applied to said image forming apparatus, and said control unit is configured to delete the firmware, the release of which is terminated, in accordance with the fourth instruction information obtained by said obtaining unit.

14. The system according to claim 11, wherein said transmission unit is configured to, when firmware determined by said first determination unit not to be released at the current time has not been applied to said image forming apparatus, transmit first instruction information that contains an instruction to prevent application of the firmware to said image forming apparatus, and said control unit is configured to prevent application of the firmware determined not to be released at the current time in accordance with the first instruction information obtained by said obtaining unit.

15. The system according to claim 11, wherein said first determination unit is further configured to determine a condition of the firmware determined by said first determination unit not to be released at the current time from a plurality of conditions.

16. A method of controlling a system including an image forming apparatus and a server that distributes firmware to said image forming apparatus, said method comprising the steps of:

determining whether or not the firmware distributed to said image forming apparatus is to be released at a current time, wherein the determining step is executed in anticipation of possibility of an unexpected operation of firmware;

transmitting, when the firmware determined in said determining step not to be released at the current time has been applied to said image forming apparatus, second instruction information that contains an instruction to obtain either firmware alternative to, or a downgrade from, the firmware determined not to be released at the current time, and apply the obtained firmware to said image forming apparatus;

periodically transmitting a first request to a monitoring system for managing operation information, the operation information including an error from said image forming apparatus and a notification indicative of a firmware distribution status from said server;

transmitting a second request to said server when a response to the first request is an instruction for said server;

obtaining instruction information from said server as a response to the second request; and controlling to obtain either firmware alternative to, or a downgrade from, the firmware determined not to be released at the current time in accordance with the instruction information obtained in the obtaining step, and to apply the obtained firmware to said image forming apparatus.

\* \* \* \* \*